(12) United States Patent
Asterjadhi et al.

(10) Patent No.: US 11,153,021 B2
(45) Date of Patent: Oct. 19, 2021

(54) SOLICITING IN-BASIC SERVICE SET (BSS) INTERFERENCE REPORTS

(71) Applicant: QUALCOMM Incorporated, San Diego, CA (US)

(72) Inventors: Alfred Asterjadhi, San Diego, CA (US); Abhishek Pramod Patil, San Diego, CA (US); George Cherian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 139 days.

(21) Appl. No.: 16/556,017

(22) Filed: Aug. 29, 2019

(65) Prior Publication Data

US 2020/0076519 A1   Mar. 5, 2020

Related U.S. Application Data

(60) Provisional application No. 62/726,167, filed on Aug. 31, 2018.

(51) Int. Cl.
*H04B 17/336* (2015.01)
*H04W 24/10* (2009.01)
*H04L 1/00* (2006.01)

(52) U.S. Cl.
CPC ......... *H04B 17/336* (2015.01); *H04L 1/0003* (2013.01); *H04L 1/0009* (2013.01); *H04W 24/10* (2013.01)

(58) Field of Classification Search
CPC .. H04B 17/336; H04W 24/10; H04W 52/243; H04W 74/04; H04W 74/006; H04W 8/005; H04W 48/10; H04W 48/16; H04W 76/11; H04W 48/20; H04W 72/0406; H04W 80/02; H04W 84/12; H04W 48/12; H04W 56/0005; H04W 56/0015; H04W 88/08; H04L 1/0009; H04L 1/0003; H04L 1/0027; H04L 1/0026; H04L 5/0096
See application file for complete search history.

(56) References Cited

U.S. PATENT DOCUMENTS

| | | | |
|---|---|---|---|
| 2017/0331605 A1* | 11/2017 | Shani | H04L 25/0206 |
| 2017/0347279 A1* | 11/2017 | Bejerano | H04W 24/02 |
| 2018/0124746 A1* | 5/2018 | Choi | H04L 5/0023 |
| 2021/0028831 A1* | 1/2021 | Lou | H04B 7/0417 |

* cited by examiner

*Primary Examiner* — Brian T O Connor
(74) *Attorney, Agent, or Firm* — Holland & Hart LLP

(57) ABSTRACT

Methods, systems, and devices for wireless communications are described. Techniques may include transmitting, from an access point (AP) to a first set of stations (STAs) a first message soliciting an uplink transmission by the first set of STAs over a wireless channel, transmitting to a second set STAs a second message including an instruction to monitor the wireless channel for interference during the uplink transmission by the first set of STAs; transmitting to the second set of STAs a third message triggering an interference report; and receiving an interference report based on the second and third messages. Techniques include identifying a plurality of sectors of a geographic coverage area corresponding to the AP; transmitting a set of directional training signals; receiving a signal to noise ratio (SNR) report from multiple STAs; comparing the received SNR reports on a per sector basis; and adjusting communication based on the comparing.

30 Claims, 20 Drawing Sheets

SOLICITING IN-BASIC SERVICE SET (BSS) INTERFERENCE REPORTS

CROSS REFERENCE

The present Application for Patent claims the benefit of U.S. Provisional Patent Application No. 62/726,167 by ASTERJADHI et al., entitled "SOLICITING IN-BASIC SERVICE SET (BSS) INTERFERENCE REPORTS," filed Aug. 31, 2018, assigned to the assignee hereof, and expressly incorporated herein.

BACKGROUND

The following relates generally to wireless communications, and more specifically to soliciting in-basic service set (BSS) interference reports.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11 network may include an access point (AP) that communicates with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

An AP may communicate with various stations (STAs). The AP may communicate with the STAs in a single channel communication mode, or a multi-channel communication mode. In some examples, the AP may communicate with the STAs in a full duplex mode. In some examples, an AP may identify and communicate with groups of STAs, each of which may include one or more STAs.

SUMMARY

The described techniques relate to improved methods, systems, devices, and apparatuses that support soliciting in-basic service set (BSS) interference reports. Generally, the described techniques provide for transmitting, from an access point (AP) to a first set of stations (STAs) a first message soliciting an uplink transmission by the first set of one or more STAs over a wireless channel, transmitting to a second set STAs a second message including an instruction to monitor the wireless channel for interference during the uplink transmission by the first set of STAs; transmitting to the second set of one or more STAs a third message triggering an interference report; and receiving, from the second set of STAs, an interference report based at least in part on the second message and the third message. Techniques may further include identifying a plurality of sectors of a geographic coverage area corresponding to the AP; transmitting a set of one or more directional training signals, each directional training signals corresponding to a sector; receiving, based at least in part on the set of one or more directional training signals, a signal to noise ratio (SNR) report from each STA located within the geographic coverage area; comparing the received SNR reports for each STA on a per sector basis; and adjusting a communication parameter based at least in part on the comparing.

A method of wireless communication at an access point is described. The method may include transmitting to a first set of one or more stations a first message soliciting an uplink transmission by the first set of one or more stations over a wireless channel, transmitting to a second set of one or more stations a second message including an instruction to monitor the wireless channel for interference during the uplink transmission by the first set of one or more stations, transmitting to the second set of one or more stations a third message triggering an interference report, and receiving, from the second set of one or more stations, an interference report based on the second message and the third message.

An apparatus for wireless communication at an access point is described. The apparatus may include a first interface, a second interface, and a wireless modem. The wireless modem may be configured to transmit to a first set of one or more stations a first message soliciting an uplink transmission by the first set of one or more stations over a wireless channel, transmit to a second set of one or more stations a second message including an instruction to monitor the wireless channel for interference during the uplink transmission by the first set of one or more stations, transmit to the second set of one or more stations a third message triggering an interference report, and receive, from the second set of one or more stations, an interference report based on the second message and the third message.

Another apparatus for wireless communication at an access point is described. The apparatus may include means for transmitting to a first set of one or more stations a first message soliciting an uplink transmission by the first set of one or more stations over a wireless channel, transmitting to a second set of one or more stations a second message including an instruction to monitor the wireless channel for interference during the uplink transmission by the first set of one or more stations, transmitting to the second set of one or more stations a third message triggering an interference report, and receiving, from the second set of one or more stations, an interference report based on the second message and the third message.

A non-transitory computer-readable medium storing code for wireless communication at an access point is described. The code may include instructions executable by a processor to transmit to a first set of one or more stations a first message soliciting an uplink transmission by the first set of one or more stations over a wireless channel, transmit to a second set of one or more stations a second message including an instruction to monitor the wireless channel for interference during the uplink transmission by the first set of one or more stations, transmit to the second set of one or more stations a third message triggering an interference report, and receive, from the second set of one or more stations, an interference report based on the second message and the third message.

In some examples of the method, apparatuses, and non-transitory computer-readable medium described herein, and adjusting a communication parameter based on one or more of: the interference report or an identification of a hidden node.

In some examples of the method, apparatuses, and non-transitory computer-readable medium described herein, the communication parameter includes one or more of a modulation and coding scheme (MCS), a resource unit (RU) size, or an RU allocation.

In some examples of the method, apparatuses, and non-transitory computer-readable medium described herein, and modifying, based on the interference report, one or more of: the first set of one or more stations or the second set of one or more stations or generating, based on the interference report, a third set of one or more stations.

Some examples of the method, apparatuses, and non-transitory computer-readable medium described herein may further include operations, features, means, or instructions for transmitting the first message includes transmitting a first portion of a first frame including the first message, and transmitting the second message includes transmitting a second portion of the first frame including the second message.

In some examples of the method, apparatuses, and non-transitory computer-readable medium described herein, the first frame may be a first trigger frame.

Some examples of the method, apparatuses, and non-transitory computer-readable medium described herein may further include operations, features, means, or instructions for transmitting the first message on a first channel and transmitting the second message on a second channel.

In some examples of the method, apparatuses, and non-transitory computer-readable medium described herein, one of the first set of one or more stations and the second set of one or more stations may include operations, features, means, or instructions for a station associated with the access point, a station not associated with the access point, or a second access point.

Some examples of the method, apparatuses, and non-transitory computer-readable medium described herein may further include operations, features, means, or instructions for selectively allocating resources of a transmission opportunity to the second access point for a multi-access point coordinated transmission based on the interference report.

A method of wireless communication at a first station is described. The method may include receiving a first message to a first set of one or more stations including the first station, the first message including an instruction to monitor a first wireless channel for interference by a second set of one or more stations during an uplink transmission from the second set of one or more stations over the first wireless channel, monitoring the first wireless channel for interference from the second set of one or more stations during the uplink transmission based on the first message, receiving a second message to the first set of one or more stations, the second message soliciting an interference report, and transmitting an interference report based on the first message and the second message.

An apparatus for wireless communication at a first station is described. The apparatus may include a first interface, a second interface, and a wireless modem. The wireless modem may be configured to receive a first message from a first set of one or more stations including the first station, the first message including an instruction to monitor a first wireless channel for interference by a second set of one or more stations during an uplink transmission from the second set of one or more stations over the first wireless channel, monitor the first wireless channel for interference from the second set of one or more stations during the uplink transmission based on the first message, receive a second message to the first set of one or more stations, the second message soliciting an interference report, and transmit an interference report based on the first message and the second message.

Another apparatus for wireless communication at a first station is described. The apparatus may include means for receiving a first message to a first set of one or more stations including the first station, the first message including an instruction to monitor a first wireless channel for interference by a second set of one or more stations during an uplink transmission from the second set of one or more stations over the first wireless channel, monitoring the first wireless channel for interference from the second set of one or more stations during the uplink transmission based on the first message, receiving a second message to the first set of one or more stations, the second message soliciting an interference report, and transmitting an interference report based on the first message and the second message.

A non-transitory computer-readable medium storing code for wireless communication at a first station is described. The code may include instructions executable by a processor to receive a first message to a first set of one or more stations including the first station, the first message including an instruction to monitor a first wireless channel for interference by a second set of one or more stations during an uplink transmission from the second set of one or more stations over the first wireless channel, monitor the first wireless channel for interference from the second set of one or more stations during the uplink transmission based on the first message, receive a second message to the first set of one or more stations, the second message soliciting an interference report, and transmit an interference report based on the first message and the second message.

In some examples of the method, apparatuses, and non-transitory computer-readable medium described herein, receiving the first message may include operations, features, means, or instructions for receiving a first frame including the first message to the first set of one or more stations and a third message to the second set of one or more stations, and determining that the first set of one or more stations includes the first station, where receiving the first message for the first set of one or more stations may be based on the determining.

In some examples of the method, apparatuses, and non-transitory computer-readable medium described herein, the first frame includes a trigger frame.

Some examples of the method, apparatuses, and non-transitory computer-readable medium described herein may further include operations, features, means, or instructions for determining, based on the first frame, that the first set of one or more stations includes the first station.

In some examples of the method, apparatuses, and non-transitory computer-readable medium described herein, the first message may include operations, features, means, or instructions for a list of station identifiers corresponding to the first set of one or more stations or a group identifier identifying the first set of one or more stations.

In some examples of the method, apparatuses, and non-transitory computer-readable medium described herein, the second message includes a bandwidth query report poll (BQRP) or a CQI trigger.

Some examples of the method, apparatuses, and non-transitory computer-readable medium described herein may further include operations, features, means, or instructions for receiving the first message on a second wireless channel, where monitoring the first wireless channel may be based on receiving the first message on the second wireless channel.

In some examples of the method, apparatuses, and non-transitory computer-readable medium described herein, the first message and the second message may be included in a first feedback report poll.

In some examples of the method, apparatuses, and non-transitory computer-readable medium described herein, the first feedback report poll may be a trigger frame.

Some examples of the method, apparatuses, and non-transitory computer-readable medium described herein may further include operations, features, means, or instructions for transmitting a set of feedback report polls subsequent to the first feedback report poll, and receiving a set of feedback reports based on the set of feedback report polls, the set of feedback reports providing real time interference information during the uplink transmission.

In some examples of the method, apparatuses, and non-transitory computer-readable medium described herein, the first feedback report poll includes one of a bandwidth query report poll (BQRP) or a CQI trigger.

In some examples of the method, apparatuses, and non-transitory computer-readable medium described herein, monitoring the first wireless channel further may include operations, features, means, or instructions for, and monitoring one or more of: a transmission band, a set of one or more subchannels, or a group of resource units (RUs).

In some examples of the method, apparatuses, and non-transitory computer-readable medium described herein, the first message and the second message may be from a first access point, and the first station may include operations, features, means, or instructions for a station associated with the first access point, a station not associated with the first access point, or a second access point.

A method of wireless communication at an access point is described. The method may include identifying a plurality of sectors of a geographic coverage area corresponding to the access point, transmitting a set of one or more directional training signals, each of the set of one or more directional training signals corresponding to a sector of the plurality of sectors, receiving, based on the set of one or more directional training signals, a signal to noise ratio (SNR) report from a set of one or more stations located within the geographic coverage area, comparing the received SNR reports for each station of the set of one or more stations for each sector, and adjusting a communication parameter based on the comparing.

An apparatus for wireless communication at an access point is described. The apparatus may include a first interface, a second interface, and a wireless modem. The wireless modem may be configured to identify a plurality of sectors of a geographic coverage area corresponding to the access point, transmit a set of one or more directional training signals, each of the set of one or more directional training signals corresponding to a sector of the plurality of sectors, receive, based on the set of one or more directional training signals, a signal to noise ratio (SNR) report from a set of one or more stations located within the geographic coverage area, compare the received SNR reports for each station of the set of one or more stations for each sector, and adjust a communication parameter based on the comparing.

Another apparatus for wireless communication at an access point is described. The apparatus may include means for identifying a plurality of sectors of a geographic coverage area corresponding to the access point, transmitting a set of one or more directional training signals, each of the set of one or more directional training signals corresponding to a sector of the plurality of sectors, receiving, based on the set of one or more directional training signals, a signal to noise ratio (SNR) report from a set of one or more stations located within the geographic coverage area, comparing the received SNR reports for each station of the set of one or more stations for each sector, and adjusting a communication parameter based on the comparing.

A non-transitory computer-readable medium storing code for wireless communication at an access point is described. The code may include instructions executable by a processor to identify a plurality of sectors of a geographic coverage area corresponding to the access point, transmit a set of one or more directional training signals, each of the set of one or more directional training signals corresponding to a sector of the plurality of sectors, receive, based on the set of one or more directional training signals, a signal to noise ratio (SNR) report from a set of one or more stations located within the geographic coverage area, compare the received SNR reports for each station of the set of one or more stations for each sector, and adjust a communication parameter based on the comparing.

In some examples of the method, apparatuses, and non-transitory computer-readable medium described herein, comparing the received SNR reports for each station further may include operations, features, means, or instructions for generating an SNR matrix for each station located within the geographic coverage area with respect to each sector, where adjusting the communication parameter may be based on the SNR matrix.

Some examples of the method, apparatuses, and non-transitory computer-readable medium described herein may further include operations, features, means, or instructions for identifying a computational complexity threshold for the access point, and determining an angular width for each sector based on the identified computational complexity threshold.

Some examples of the method, apparatuses, and non-transitory computer-readable medium described herein may further include operations, features, means, or instructions for identifying a hidden node, where adjusting the communication parameter may be based on the identifying.

Some examples of the method, apparatuses, and non-transitory computer-readable medium described herein may further include operations, features, means, or instructions for modifying, based on the comparing, one or more sets of one or more stations or generating, based on the received SNR reports, one or more sets of stations.

In some examples of the method, apparatuses, and non-transitory computer-readable medium described herein, the access point may be a first access point and the set of one or more stations for each sector may include operations, features, means, or instructions for a station associated with the access point, a station not associated with the access point, or a second access point.

A method of wireless communication at a station is described. The method may include receiving a set of directional training signals, each of the set of directional training signals corresponding to a sector of a plurality of sectors, determining a signal to noise ratio (SNR) parameter for each directional training signal of the set of directional training signals, and transmitting an SNR report based on the received set of directional training signals and the determined SNR parameters.

An apparatus for wireless communication at a station is described. The apparatus may include a first interface, a second interface, and a wireless modem. The wireless modem may be configured to receive a set of directional training signals, each of the set of directional training signals corresponding to a sector of a plurality of sectors, determine a signal to noise ratio (SNR) parameter for each directional training signal of the set of directional training signals, and transmit an SNR report based on the received set of directional training signals and the determined SNR parameters.

Another apparatus for wireless communication at a station is described. The apparatus may include means for receiving a set of directional training signals, each of the set of directional training signals corresponding to a sector of a plurality of sectors, determining a signal to noise ratio (SNR) parameter for each directional training signal of the set of directional training signals, and transmitting an SNR report based on the received set of directional training signals and the determined SNR parameters.

A non-transitory computer-readable medium storing code for wireless communication at a station is described. The code may include instructions executable by a processor to receive a set of directional training signals, each of the set of directional training signals corresponding to a sector of a plurality of sectors, determine a signal to noise ratio (SNR) parameter for each directional training signal of the set of directional training signals, and transmit an SNR report based on the received set of directional training signals and the determined SNR parameters.

In some examples of the method, apparatuses, and non-transitory computer-readable medium described herein, the set of directional training signals may be from a first access point, and the station may include operations, features, means, or instructions for a station associated with the first access point, a station not associated with the first access point, or a second access point.

A method of wireless communication at an access point is described. The method may include a first interface, a second interface, a wireless modem coupled with the first interface and the second interface, where the wireless modem is configured to, transmitting to a second set of one or more stations a second message including an instruction to monitor the wireless channel for interference during the uplink transmission by the first set of one or more stations, transmitting to the second set of one or more stations a third message triggering an interference report, and receiving, from the second set of one or more stations, an interference report based on the second message and the third message.

An apparatus for wireless communication at an access point is described. The apparatus may include a first interface, a second interface, and a wireless modem. The wireless modem may be configured to transmit to a second set of one or more stations a second message including an instruction to monitor the wireless channel for interference during the uplink transmission by the first set of one or more stations, transmit to the second set of one or more stations a third message triggering an interference report, and receive, from the second set of one or more stations, an interference report based on the second message and the third message.

Another apparatus for wireless communication at an access point is described. The apparatus may include means for a first interface, a second interface, a wireless modem coupled with the first interface and the second interface, where the wireless modem is configured to, transmitting to a second set of one or more stations a second message including an instruction to monitor the wireless channel for interference during the uplink transmission by the first set of one or more stations, transmitting to the second set of one or more stations a third message triggering an interference report, and receiving, from the second set of one or more stations, an interference report based on the second message and the third message.

A non-transitory computer-readable medium storing code for wireless communication at an access point is described. The code may include instructions executable by a processor to a first interface, a second interface, a wireless modem coupled with the first interface and the second interface, where the wireless modem is configured to, transmit to a second set of one or more stations a second message including an instruction to monitor the wireless channel for interference during the uplink transmission by the first set of one or more stations, transmit to the second set of one or more stations a third message triggering an interference report, and receive, from the second set of one or more stations, an interference report based on the second message and the third message.

In some examples of the method, apparatuses, and non-transitory computer-readable medium described herein, and adjust a communication parameter based on one or more of: the interference report or an identification of a hidden node.

In some examples of the method, apparatuses, and non-transitory computer-readable medium described herein, the communication parameter includes one or more of a modulation and coding scheme (MCS), a resource unit (RU) size, or an RU allocation.

In some examples of the method, apparatuses, and non-transitory computer-readable medium described herein, and modify, based on the interference report, one or more of: the first set of one or more stations or the second set of one or more stations or generate, based on the interference report, a third set of one or more stations.

Some examples of the method, apparatuses, and non-transitory computer-readable medium described herein may further include operations, features, means, or instructions for transmitting a first portion of a first frame including the first message, and transmit a second portion of the first frame including the second message.

In some examples of the method, apparatuses, and non-transitory computer-readable medium described herein, the first frame may be a first trigger frame.

Some examples of the method, apparatuses, and non-transitory computer-readable medium described herein may further include operations, features, means, or instructions for transmitting the first message on a first channel and transmitting the second message on a second channel.

In some examples of the method, apparatuses, and non-transitory computer-readable medium described herein, each of the first set of one or more stations and the second set of one or more stations may include operations, features, means, or instructions for a station associated with the access point, a station not associated with the access point, or a second access point.

Some examples of the method, apparatuses, and non-transitory computer-readable medium described herein may further include operations, features, means, or instructions for selectively allocating resources of a transmission opportunity to the second access point for a multi-access point coordinated transmission based on the interference report.

A method of wireless communication at a first station is described. The method may include a first interface, a second interface, a wireless modem coupled with the first interface and the second interface, where the wireless modem is configured to, monitoring the first wireless channel for interference from the second set of one or more stations during the uplink transmission based on the first message, receiving a second message to the first set of one or more stations, the second message soliciting an interference report, and transmitting an interference report based on the first message and the second message.

An apparatus for wireless communication at a first station is described. The apparatus may include a first interface, a second interface, and a wireless modem. The wireless modem may be configured to monitor a first wireless channel for interference from a second set of one or more stations during an uplink transmission based on a first message, receive a second message from the first set of one or more stations, the second message soliciting an interference report, and transmit an interference report based on the first message and the second message.

Another apparatus for wireless communication at a first station is described. The apparatus may include means for a first interface, a second interface, a wireless modem coupled with the first interface and the second interface, where the wireless modem is configured to, monitoring the first wireless channel for interference from the second set of one or more stations during the uplink transmission based on the first message, receiving a second message to the first set of one or more stations, the second message soliciting an interference report, and transmitting an interference report based on the first message and the second message.

A non-transitory computer-readable medium storing code for wireless communication at a first station is described. The code may include instructions executable by a processor to a first interface, a second interface, a wireless modem coupled with the first interface and the second interface, where the wireless modem is configured to, monitor the first wireless channel for interference from the second set of one or more stations during the uplink transmission based on the first message, receive a second message to the first set of one or more stations, the second message soliciting an interference report, and transmit an interference report based on the first message and the second message.

Some examples of the method, apparatuses, and non-transitory computer-readable medium described herein may further include operations, features, means, or instructions for receiving a first frame including the first message to the first set of one or more stations and a third message to the second set of one or more stations, and determine that the first set of one or more stations includes the first station, where receiving the first message for the first set of one or more stations may be based on the determining.

In some examples of the method, apparatuses, and non-transitory computer-readable medium described herein, the first frame includes a trigger frame.

Some examples of the method, apparatuses, and non-transitory computer-readable medium described herein may further include operations, features, means, or instructions for determining, based on the first frame, that the first set of one or more stations includes the first station.

In some examples of the method, apparatuses, and non-transitory computer-readable medium described herein, the first message may include operations, features, means, or instructions for a list of station identifiers corresponding to the first set of one or more stations or a group identifier identifying the first set of one or more stations.

In some examples of the method, apparatuses, and non-transitory computer-readable medium described herein, the second message includes a bandwidth query report poll (BQRP) or a CQI trigger.

Some examples of the method, apparatuses, and non-transitory computer-readable medium described herein may further include operations, features, means, or instructions for receiving the first message on a second wireless channel, where monitoring the first wireless channel may be based on receiving the first message on the second wireless channel.

In some examples of the method, apparatuses, and non-transitory computer-readable medium described herein, the first message and the second message may be included in a first feedback report poll.

In some examples of the method, apparatuses, and non-transitory computer-readable medium described herein, the first feedback report poll may be a trigger frame.

Some examples of the method, apparatuses, and non-transitory computer-readable medium described herein may further include operations, features, means, or instructions for transmitting a set of feedback report polls subsequent to the first feedback report poll, and receive a set of feedback reports based on the set of feedback report polls, the set of feedback reports providing real time interference information during the uplink transmission.

In some examples of the method, apparatuses, and non-transitory computer-readable medium described herein, the first feedback report poll includes one of a bandwidth query report poll (BQRP) or a CQI trigger.

In some examples of the method, apparatuses, and non-transitory computer-readable medium described herein, a transmission band, a set of one or more subchannels, or a group of resource units (RUs).

In some examples of the method, apparatuses, and non-transitory computer-readable medium described herein, the first message and the second message may be from a first access point, and the first station may include operations, features, means, or instructions for a station associated with the first access point, a station not associated with the first access point, or a second access point.

A method of wireless communication at an access point is described. The method may include a first interface, a second interface, a wireless modem coupled with the first interface and the second interface, where the wireless modem is configured to, transmit a set of one or more directional training signals, each of the set of one or more directional training signals corresponding to a sector of the plurality of sectors, receiving, based on the set of one or more directional training signals, a signal to noise ratio (SNR) report from a set of one or more stations located within the geographic coverage area, comparing the received SNR reports for each station for each of the set of one or more stations, and adjusting a communication parameter based on the comparing.

An apparatus for wireless communication at an access point is described. The apparatus may include a first interface, a second interface, and a wireless modem. The wireless modem may be configured to transmit a set of one or more directional training signals, each of the set of one or more directional training signals corresponding to a sector of the plurality of sectors, receive, based on the set of one or more directional training signals, a signal to noise ratio (SNR) report from a set of one or more stations located within the geographic coverage area, compare the received SNR reports for each station for each of the set of one or more stations, and adjust a communication parameter based on the comparing.

Another apparatus for wireless communication at an access point is described. The apparatus may include means for a first interface, a second interface, a wireless modem coupled with the first interface and the second interface, where the wireless modem is configured to, transmitting a set of one or more directional training signals, each of the set of one or more directional training signals corresponding to a sector of the plurality of sectors, receiving, based on the set of one or more directional training signals, a signal to noise ratio (SNR) report from a set of one or more stations located within the geographic coverage area, comparing the received SNR reports for each station for each of the set of one or more stations, and adjusting a communication parameter based on the comparing.

A non-transitory computer-readable medium storing code for wireless communication at an access point is described. The code may include instructions executable by a processor to a first interface, a second interface, a wireless modem coupled with the first interface and the second interface, where the wireless modem is configured to, transmit a set of one or more directional training signals, each of the set of one or more directional training signals corresponding to a sector of the plurality of sectors, receive, based on the set of one or more directional training signals, a signal to noise ratio (SNR) report from a set of one or more stations located within the geographic coverage area, compare the received SNR reports for each station for each of the set of one or more stations, and adjust a communication parameter based on the comparing.

Some examples of the method, apparatuses, and non-transitory computer-readable medium described herein may further include operations, features, means, or instructions for generating an SNR matrix for each station located within the geographic coverage area with respect to each sector, where adjusting the communication parameter may be based on the SNR matrix.

Some examples of the method, apparatuses, and non-transitory computer-readable medium described herein may further include operations, features, means, or instructions for identifying a computational complexity threshold for the access point, and determine an angular width for each sector based on the identified computational complexity threshold.

Some examples of the method, apparatuses, and non-transitory computer-readable medium described herein may further include operations, features, means, or instructions for identifying a hidden node, where adjusting the communication parameter may be based on the identifying.

Some examples of the method, apparatuses, and non-transitory computer-readable medium described herein may further include operations, features, means, or instructions for modifying, based on the comparing, one or more sets of one or more stations, and generate, based on the received SNR reports, one or more sets of stations.

In some examples of the method, apparatuses, and non-transitory computer-readable medium described herein, the access point may be a first access point and the set of one or more stations for each sector may include operations, features, means, or instructions for a station associated with the access point, a station not associated with the access point, or a second access point.

A method of wireless communication at a station is described. The method may include a first interface, a second interface, a wireless modem coupled with the first interface and the second interface, where the wireless modem is configured to, determining a signal to noise ratio (SNR) parameter for each directional training signal of the set of directional training signals, and transmitting an SNR report based on the received set of directional training signals and the determined SNR parameters.

An apparatus for wireless communication at a station is described. The apparatus may include a first interface, a second interface, and a wireless modem. The wireless modem may be configured to determine a signal to noise ratio (SNR) parameter for each directional training signal of the set of directional training signals, and transmit an SNR report based on the received set of directional training signals and the determined SNR parameters.

Another apparatus for wireless communication at a station is described. The apparatus may include means for a first interface, a second interface, a wireless modem coupled with the first interface and the second interface, where the wireless modem is configured to, determining a signal to noise ratio (SNR) parameter for each directional training signal of the set of directional training signals, and transmitting an SNR report based on the received set of directional training signals and the determined SNR parameters.

A non-transitory computer-readable medium storing code for wireless communication at a station is described. The code may include instructions executable by a processor to a first interface, a second interface, a wireless modem coupled with the first interface and the second interface, where the wireless modem is configured to, determine a signal to noise ratio (SNR) parameter for each directional training signal of the set of directional training signals, and transmit an SNR report based on the received set of directional training signals and the determined SNR parameters.

In some examples of the method, apparatuses, and non-transitory computer-readable medium described herein, the set of directional training signals may be from a first access point, and the station may include operations, features, means, or instructions for a station associated with the first access point, a station not associated with the first access point, or a second access point.

A method of wireless communication at an access point is described. The method may include means for transmitting to a first set of one or more stations a first message soliciting an uplink transmission by the first set of one or more stations over a wireless channel, means for transmitting to a second set of one or more stations a second message including an instruction to monitor the wireless channel for interference during the uplink transmission by the first set of one or more stations, means for transmitting to the second set of one or more stations a third message triggering an interference report, and means for receiving, from the second set of one or more stations, an interference report based on the second message and the third message.

An apparatus for wireless communication at an access point is described. The apparatus may include a first interface, a second interface, and a wireless modem. The wireless modem may provide means for transmitting to a first set of one or more stations a first message soliciting an uplink transmission by the first set of one or more stations over a wireless channel, means for transmitting to a second set of one or more stations a second message including an instruction to monitor the wireless channel for interference during the uplink transmission by the first set of one or more stations, means for transmitting to the second set of one or more stations a third message triggering an interference report, and means for receiving, from the second set of one or more stations, an interference report based on the second message and the third message.

Another apparatus for wireless communication at an access point is described. The apparatus may include means for means for transmitting to a first set of one or more stations a first message soliciting an uplink transmission by the first set of one or more stations over a wireless channel, means for transmitting to a second set of one or more stations a second message including an instruction to monitor the wireless channel for interference during the uplink transmission by the first set of one or more stations, means for transmitting to the second set of one or more stations a third message triggering an interference report, and means for receiving, from the second set of one or more stations, an interference report based on the second message and the third message.

A non-transitory computer-readable medium storing code for wireless communication at an access point is described. The code may include instructions executable by a processor to means for transmitting to a first set of one or more stations a first message soliciting an uplink transmission by the first set of one or more stations over a wireless channel, means for transmitting to a second set of one or more stations a second message including an instruction to monitor the wireless channel for interference during the uplink transmission by the first set of one or more stations, means for transmitting to the second set of one or more stations a third message triggering an interference report, and means for receiving, from the second set of one or more stations, an interference report based on the second message and the third message.

A method of wireless communication at a first station is described. The method may include means for receiving a first message to a first set of one or more stations including the first station, the first message including an instruction to monitor a first wireless channel for interference by a second set of one or more stations during an uplink transmission from the second set of one or more stations over the first wireless channel, means for monitoring the first wireless channel for interference from the second set of one or more stations during the uplink transmission based on the first message, means for receiving a second message to the first set of one or more stations, the second message soliciting an interference report, and means for transmitting an interference report based on the first message and the second message.

An apparatus for wireless communication at a first station is described. The apparatus may include a first interface, a second interface, and a wireless modem. The wireless modem may provide means for receiving a first message to a first set of one or more stations including the first station, the first message including an instruction to monitor a first wireless channel for interference by a second set of one or more stations during an uplink transmission from the second set of one or more stations over the first wireless channel, means for monitoring the first wireless channel for interference from the second set of one or more stations during the uplink transmission based on the first message, means for receiving a second message to the first set of one or more stations, the second message soliciting an interference report, and means for transmitting an interference report based on the first message and the second message.

Another apparatus for wireless communication at a first station is described. The apparatus may include means for means for receiving a first message to a first set of one or more stations including the first station, the first message including an instruction to monitor a first wireless channel for interference by a second set of one or more stations during an uplink transmission from the second set of one or more stations over the first wireless channel, means for monitoring the first wireless channel for interference from the second set of one or more stations during the uplink transmission based on the first message, means for receiving a second message to the first set of one or more stations, the second message soliciting an interference report, and means for transmitting an interference report based on the first message and the second message.

A non-transitory computer-readable medium storing code for wireless communication at a first station is described. The code may include instructions executable by a processor to means for receiving a first message to a first set of one or more stations including the first station, the first message including an instruction to monitor a first wireless channel for interference by a second set of one or more stations during an uplink transmission from the second set of one or more stations over the first wireless channel, means for monitoring the first wireless channel for interference from the second set of one or more stations during the uplink transmission based on the first message, means for receiving a second message to the first set of one or more stations, the second message soliciting an interference report, and means for transmitting an interference report based on the first message and the second message.

A method of wireless communication at an access point is described. The method may include means for identifying a plurality of sectors of a geographic coverage area corresponding to the access point, means for transmitting a set of one or more directional training signals, each of the set of one or more directional training signals corresponding to a sector of the plurality of sectors, means for receiving, based on the set of one or more directional training signals, a signal to noise ratio (SNR) report from a set of one or more stations located within the geographic coverage area, means for comparing the received SNR reports for each station on a per sector basis, and means for adjusting a communication parameter based on the comparing.

An apparatus for wireless communication at an access point is described. The apparatus may include a first interface, a second interface, and a wireless modem. The wireless modem may provide means for identifying a plurality of sectors of a geographic coverage area corresponding to the access point, means for transmitting a set of one or more directional training signals, each of the set of one or more directional training signals corresponding to a sector of the plurality of sectors, means for receiving, based on the set of one or more directional training signals, a signal to noise ratio (SNR) report from a set of one or more stations located within the geographic coverage area, means for comparing the received SNR reports for each station on a per sector basis, and means for adjusting a communication parameter based on the comparing.

Another apparatus for wireless communication at an access point is described. The apparatus may include means for means for identifying a plurality of sectors of a geographic coverage area corresponding to the access point, means for transmitting a set of one or more directional training signals, each of the set of one or more directional training signals corresponding to a sector of the plurality of sectors, means for receiving, based on the set of one or more directional training signals, a signal to noise ratio (SNR) report from a set of one or more stations located within the geographic coverage area, means for comparing the received SNR reports for each station on a per sector basis, and means for adjusting a communication parameter based on the comparing.

A non-transitory computer-readable medium storing code for wireless communication at an access point is described. The code may include instructions executable by a processor to means for identifying a plurality of sectors of a geographic coverage area corresponding to the access point, means for transmitting a set of one or more directional training signals, each of the set of one or more directional training signals corresponding to a sector of the plurality of sectors, means for receiving, based on the set of one or more directional training signals, a signal to noise ratio (SNR) report from a set of one or more stations located within the geographic coverage area, means for comparing the received SNR reports for each station on a per sector basis, and means for adjusting a communication parameter based on the comparing.

A method of wireless communication at a station is described. The method may include means for receiving a set of directional training signals, each of the set of directional training signals corresponding to a sector of a plurality of sectors, means for determining a signal to noise ratio (SNR) parameter for each directional training signal of the set of directional training signals, and means for transmitting an SNR report based on the received set of directional training signals and the determined SNR parameters.

An apparatus for wireless communication at a station is described. The apparatus may include a first interface, a second interface, and a wireless modem. The wireless modem may provide means for receiving a set of directional training signals, each of the set of directional training signals corresponding to a sector of a plurality of sectors, means for determining a signal to noise ratio (SNR) parameter for each directional training signal of the set of directional training signals, and means for transmitting an SNR report based on the received set of directional training signals and the determined SNR parameters.

Another apparatus for wireless communication at a station is described. The apparatus may include means for means for receiving a set of directional training signals, each of the set of directional training signals corresponding to a sector of a plurality of sectors, means for determining a signal to noise ratio (SNR) parameter for each directional training signal of the set of directional training signals, and means for transmitting an SNR report based on the received set of directional training signals and the determined SNR parameters.

A non-transitory computer-readable medium storing code for wireless communication at a station is described. The code may include instructions executable by a processor to means for receiving a set of directional training signals, each of the set of directional training signals corresponding to a sector of a plurality of sectors, means for determining a signal to noise ratio (SNR) parameter for each directional training signal of the set of directional training signals, and means for transmitting an SNR report based on the received set of directional training signals and the determined SNR parameters.

DETAILED DESCRIPTION

Figure 1:
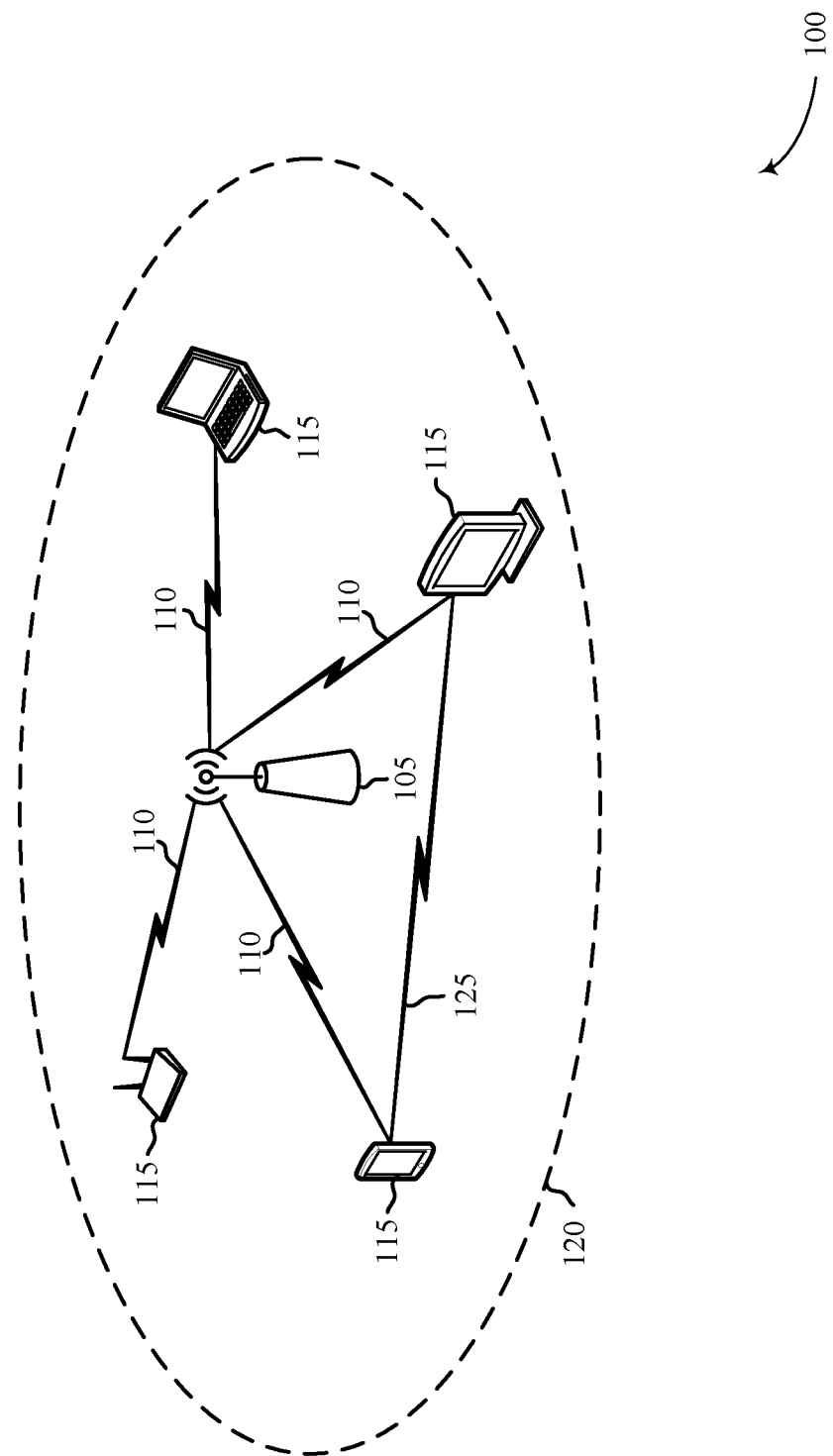
FIG. 1 illustrates an example of a wireless local area network (WLAN) that supports soliciting in-basic service set (BSS) interference reports in accordance with aspects of the present disclosure.

In some examples of a WLAN, an access point (AP) may communicate with one or more stations (STAs). The AP may communicate in a half-duplex mode, a full duplex mode, or another communication mode. Full duplex mode may involve, for example, uplink and downlink transmissions on a shared link, or uplink and downlink transmissions on different links. In some examples (e.g., when operating in a full duplex mode) an AP may determine whether a first and second STA are sufficiently isolated such that the AP can receive an uplink transmission from a first STA and simultaneous send a downlink transmission to the second STA. In some examples, the AP may adjust the modulation and coding school (MCS) of a downlink transmission based on a simultaneous uplink transmission. In some examples, the AP may group or regroup the STAs together (e.g., based on transmission power limitations for the STAs to avoid interference). In one or more of these cases, the AP may find detailed interference information regarding individual STAs or groups of STAs desirable. That is, the AP may more efficiently manage and schedule a network based on improved interference information.

In some examples, the AP may send a first message soliciting an uplink transmission from a first set of one or more STAs, and a second message indicating that another set of one or more STAs should monitor for interference during the uplink transmission. The first message and the second message may be included in a single frame (e.g., a trigger frame) transmitted on a single channel. The second set of STAs may monitor for interference. The AP may transmit a polling signal soliciting a feedback report from the second set of STAs, and the AP may glean the improved feedback information based on the feedback report. In some examples, the first message may be transmitted on a first channel, soliciting an uplink transmission on the first channel. The second message and the feedback report poll may be transmitted on a second channel, and the feedback report may be transmitted to the AP on the second channel.

In some examples, an AP may divide a geographic coverage area into a set of sectors. The AP may transmit a set of directional training signals, where each training signal corresponds to one of the sectors. STAs may be instructed to transmit an SNR report for each of the directional training signals on a per sector bias. Thus, the AP may generate an SNR matrix indicating an SNR for each STA for each sector. This interference information on a per STA level of granularity may be used by the AP to adjust an MCS, group or regroup STAs, schedule full duplex transmissions, or the like.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the IEEE 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Particular aspects of the subject matter described herein may be implemented to realize one or more advantages. The described techniques may support improvements in BSS composition, in-BSS transmissions, decreasing STA interference, STA grouping, and AP-to-AP coordination, among other advantages. As such, supported techniques may include improved network operations and, in some examples, may promote network efficiencies, among other benefits.

Aspects of the disclosure are initially described in the context of a wireless communications system. Aspects of the disclosure are further illustrated by and described with reference to single-channel communication timelines, multi-channel communication timelines, frame structures, wireless communications systems, and process flows. Aspects of the disclosure are further illustrated by and described with reference to apparatus diagrams, system diagrams, and flowcharts that relate to soliciting in-BSS interference reports.

FIG. 1 illustrates an example of a WLAN 100 (also known as a Wi-Fi network) that supports a configuration for distributed RUs in accordance with aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS. These APs 105 and STAs 115 may communicate using distributed RUs.

Although not shown in FIG. 1, a STA 115 may be located in the intersection of more than one coverage area 110 and may associate with more than one AP 105. A single AP 105 and an associated set of STAs 115, or multiple APs 105 and associated sets of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem. In some examples, multiple devices (e.g., APs 105) may coordinate with each other across multiple BSS or within a single BSS.

In some examples, the WLAN may support transmitting, from an AP 105 to a first STAs 115 a first message soliciting an uplink transmission by the first set of one or more STAs 115 over a wireless channel, transmitting to a second set STAs 115 a second message including an instruction to monitor the wireless channel for interference during the uplink transmission by the first set of STAs 115; transmitting to the second set of one or more STAs 115 a third message triggering an interference report; and receiving, from the second set of STAs 115, an interference report based at least in part on the second message and the third message. Techniques may further include identifying a subset of coverage areas (e.g., sectors) of a geographic coverage area corresponding to the AP 105; transmitting a set of one or more directional training signals, each directional training signals corresponding to a sector; receiving, based at least in part on the set of one or more directional training signals, a signal to noise ratio (SNR) report from each STA 115 located within the geographic coverage area; comparing the received SNR reports for each STA 115 on a per sector basis; and adjusting a communication parameter based at least in part on the comparing.

Figure 2:
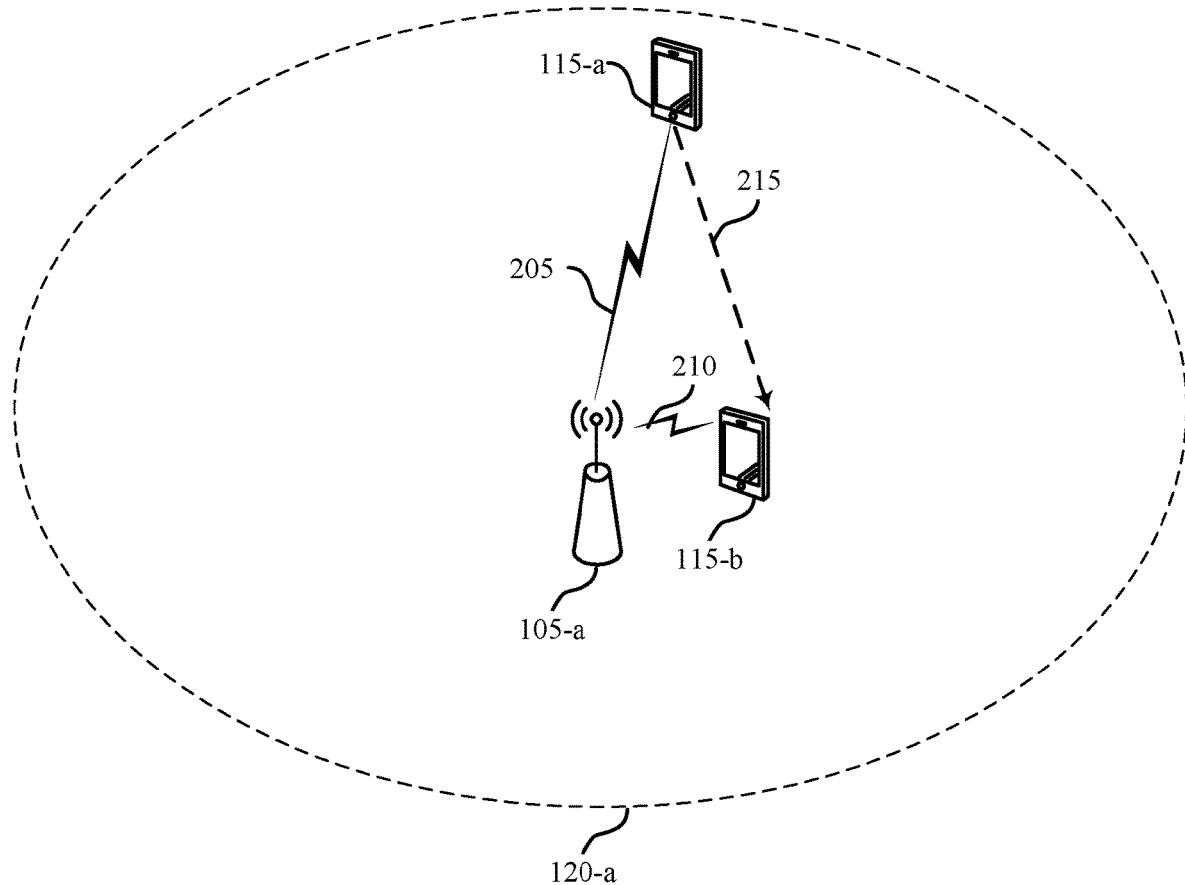
FIG. 2 illustrates an example of a wireless communications system that supports soliciting in-BSS interference reports in accordance with aspects of the present disclosure.

FIG. 2 illustrates an example of a wireless communications system 200 that supports soliciting in-BSS interference reports in accordance with aspects of the present disclosure. In some examples, wireless communications system 200 may implement aspects of WLAN 100, and may include AP 105-*a*, a STA 115-*a*, and STA 115-*b*, which may be examples of the corresponding devices described with reference to FIG. 1.

In some examples of a WLAN, one or more APs 105 may be in wireless communication with one or more STAs 115. For instance, AP 105-*a* may be in wireless communication with STA 115-*a* via communication link 205 and STA 115-*b* via communication link 210. STA 115-*a* may be an outer STA 115 (e.g., a STA that is on the outer edge of a geographic coverage area 120-*a*) and STA 115-*b* may be an inner STA 115 (e.g., a STA that is towards the center of a geographic coverage area 120-*a*). In some examples, AP 105-*a* may be half duplex capable, full duplex capable, or otherwise configured. In some examples, AP 105-*a* may communicate with one or more STAs 115 via single band communication, multi-band aggregation, or dual-band communication.

If AP 105-*a* is full duplex capable, AP 105-*a* may be capable of simultaneously receiving an uplink transmission and sending a downlink transmission. For instance, AP 105-*a* may be capable of simultaneously receiving an uplink transmission from STA 115-*a* on communication link 205 and sending a downlink transmission to STA 115-*b* on communication link 210. However, in some examples, an uplink transmission from STA 115-*a* on communication link 205 may cause interference 215 with the downlink transmission to STA 115-*b* on communication link 210. An AP 105-*a* may therefore determine whether there is sufficient isolation between STA 115-*a* and STA 115-*b* to perform the simultaneous uplink and downlink communications prior to engaging in full duplex communications. If sufficient isolation exists, then AP 105-*a* may schedule simultaneous uplink communications from STA 115-*a* and downlink communications with STA 115-*b*. However, it may be desirable for AP 105-*a* to solicit and receive improved information regarding inter-station interference to more efficiently manage a network and schedule, as described in greater detail with respect to FIGS. 2-8.

In some examples, AP 105-*a* may adjust an MCS based on interference information. In some examples, an uplink transmission from STA 115-*a* may have a lower effective rate. For example, STA 115-*a* may be relatively far away from AP 105-*a*, and an uplink transmission from STA 115-*a* may be transmitted using a robust MCS configuration, resulting in a relatively lower rate and throughput and a relatively longer time occupying the medium. If AP 105-*a* is not capable of operating in a full duplex mode, then a downlink transmission to STA 115-*b* may be delayed a significant amount of time until the uplink transmission from STA 115-*b* is complete and the medium is available. However, in some examples (e.g., when operating in a full duplex mode), while the uplink transmission on communication link 205 occupies the medium, AP 105-*a* may transmit a downlink transmission on communication link 210 to STA 115-*b*. Because STA 115-*b* is closer to AP 105-*a*, AP 105-*a* may send the downlink transmission at a higher MCS, and the downlink transmission may have a higher throughput. Simultaneously sending a high throughput transmission to a close STA 115-*b* and a low throughput transmission from a far STA 115-*a* may result in a high gain values. However, setting the MCS correctly to achieve high gain values may rely on the AP 105-*a* having accurate interference information. That is, identifying which STAs 115 interfere with which other STAs may be key in operations by AP 105-*a* to adjust MCS to accommodate simultaneous uplink and downlink transmission.

In some examples, AP 105-*a* may group STAs 115 into one or more sets of STAs 115. AP 105-*a* may transmit an uplink grant to one or more STAs 115 indicating that the STAs 115 are permitted to send an uplink transmission on a set of resource units (RUs). In some examples, individual STAs 115 may be granted RUs that are adjacent in frequency. For instance, STA 115-*a* may be granted a first RU (e.g., an RU that is adjacent in frequency with a second RU) and STA 115-*b* may be granted a second RU (e.g., an RU that is adjacent in frequency with the first RU). If STA 115-*a* transmits an uplink transmission on one of the resources at a high transmit power, then the uplink transmission from STA 115-*a* may cause too much interference 215 with the uplink transmission from STA 115-*b*. Thus, the AP 105-*a* may send a frame (e.g., a trigger frame) which may include a field (e.g., a received signal strength indication (RSSI) field) indicating a transmit power for each STA 115. For instance, AP 105-*a* may indicate that STA 115-*a* should send uplink transmission on link 205 at a first transmit power (e.g., a high transmit power) and that STA 115-*b* should send uplink transmission on link 210 at a second transmit power (e.g., a low transmit power).

In some examples, AP 105-*a* may group STAs 115 into sets of STAs 115. The grouping may be based on, for example, similar transmit power levels. In an illustrative example, AP 105-*a* may group STA 115-*a* into a first set of STAs 115 that have a similar transmit power and may group STA 115-*b* into a second set of STAs 115 that have similar transmit powers. In such examples, AP 105-*a* may send an uplink grant to the first set of STAs 115 including STA 115-*a*, and may indicate that each of those STA may send uplink grants on a group of RUs at a similar transmit power. Because the transmit power for each of the STAs 115 in the first set of STAs 115 are transmitted at the same or similar transmit power levels, no one STA 115 will transmit at a transmit level that is high enough to overwhelm (e.g., cause interference to) a neighboring RU. Thus, it may be desirable for AP 105-*a* to solicit and receive improved information regarding inter-station interference, and to generate a radio frequency (RF) map indicating which STAs 115 interfere with which other STAs 115. Such information may be used to group STAs 115 into one or more sets, or to regroup current sets of STAs based on current interference information. AP 105-*a* may more efficiently manage a network and decrease interference by soliciting and utilizing improved interference information regarding STAs 115 in geographic coverage area 120-*a*, as described in greater detail with respect to FIGS. 2-8.

In some examples, AP 105-*a* may coordinate with one or more additional APs 105. For example, AP 105-*a* may engage in coordinated multi point protocol (CoMP) with other APs 105. In some cases, AP 105-*a* may exchange basic information with one or more additional APs 105. The basic information may include, for example, an indication that AP 105-*a* has scheduled a downlink transmission to STA 115-*b* on communication link 205. The basic information may include some constraints (e.g., a transmit power for the granted downlink transmission, an allowed interference level, or the like) to a second AP 105. In such examples, the second AP 105 may receive the information, and determine to reuse the medium (e.g., the RUs indicated in the downlink grant for STA 115-*b*) if such reuse of the medium can be done while satisfying the indicated constraints. That is, if a second AP 105 can communicate with STA 115-*a* satisfying the constraints received form AP 105-*a* (e.g., a transmission to STA 115-*b* would not cause interference above the indicated level or would not require a transmit power higher than the indicated transmit power), then the second AP 105 may communicate with STA 115-*a* on the same RUs indicated in the downlink grant for STA 115-*b*. However, it may be desirable for AP 105-*a* to solicit and receive improved information regarding inter-station interference, and to generate a radio frequency (RF) map indicating which STAs 115 interfere with which other STAs 115. Such information may be used in coordinating with other APs 105. AP 105-*a* may more efficiently manage a network and decrease interference by soliciting and utilizing improved interference information regarding STAs 115 in geographic coverage area 120-*a*, as described in greater detail with respect to FIGS. 2-8.

In some examples, AP 105-*a* may determine whether to share a transmission opportunity (TxOP) with one or more neighbor APs 105 (not shown) in a multi-AP coordinated transmission. In such examples, AP 105-*a* may use interference measurements to determine whether to share the TxOP with the one or more neighbor APs 105. If AP 105-*a* determines to share the TxOP with one or more neighbor APs 105, AP 105-*a* may also use the interference measurements to determine which RUs of the TxOP to allocate to the one or more neighbor APs 105. In such cases, it may be desirable to determine one or more of the following factors: what interference the neighbor AP 105 would cause by simultaneously transmitting during the TxOP, what interference STAs 115 not associated with AP 105-*a* might cause to STAs 115-*a* and 115-*b*, what interference AP 105-*a* might cause to the neighbor AP 105, or what interference STA 115-*a* or STA 115-*b* may cause when sending transmissions to AP 105-*a*. Thus, improved interference information for improving scheduling and AP coordination may be desirable.

For example, a neighbor AP 105 or one or more STAs 115 that are not associated with AP 105-*a* may be included in the first set. One or more AP 105 and one or more STAs 115 may be instructed, in the first message to the first set of STAs 115, to send an uplink transmission. AP 105-*b* may receive the feedback report from the second set of STAs. Additionally or alternatively, one or more AP 105 or one or more STAs that are not associated with AP 105-*a* may be included in the second set. By including neighboring APs 105 or unassociated STAs 115 in the first set of STAs 115 or the second set of STAs 115, AP 105-*a* can use the received interference measurements to determine a) which, if any, neighboring APs 105 are candidates for a multi-AP coordinated transmission during a TxOP owned by AP 105-*a*, and b) which RUs of the shared TxOP to allocate to the one or more neighboring APs 105 for the multi-AP coordinated transmission during the TxOP.

Figure 3:
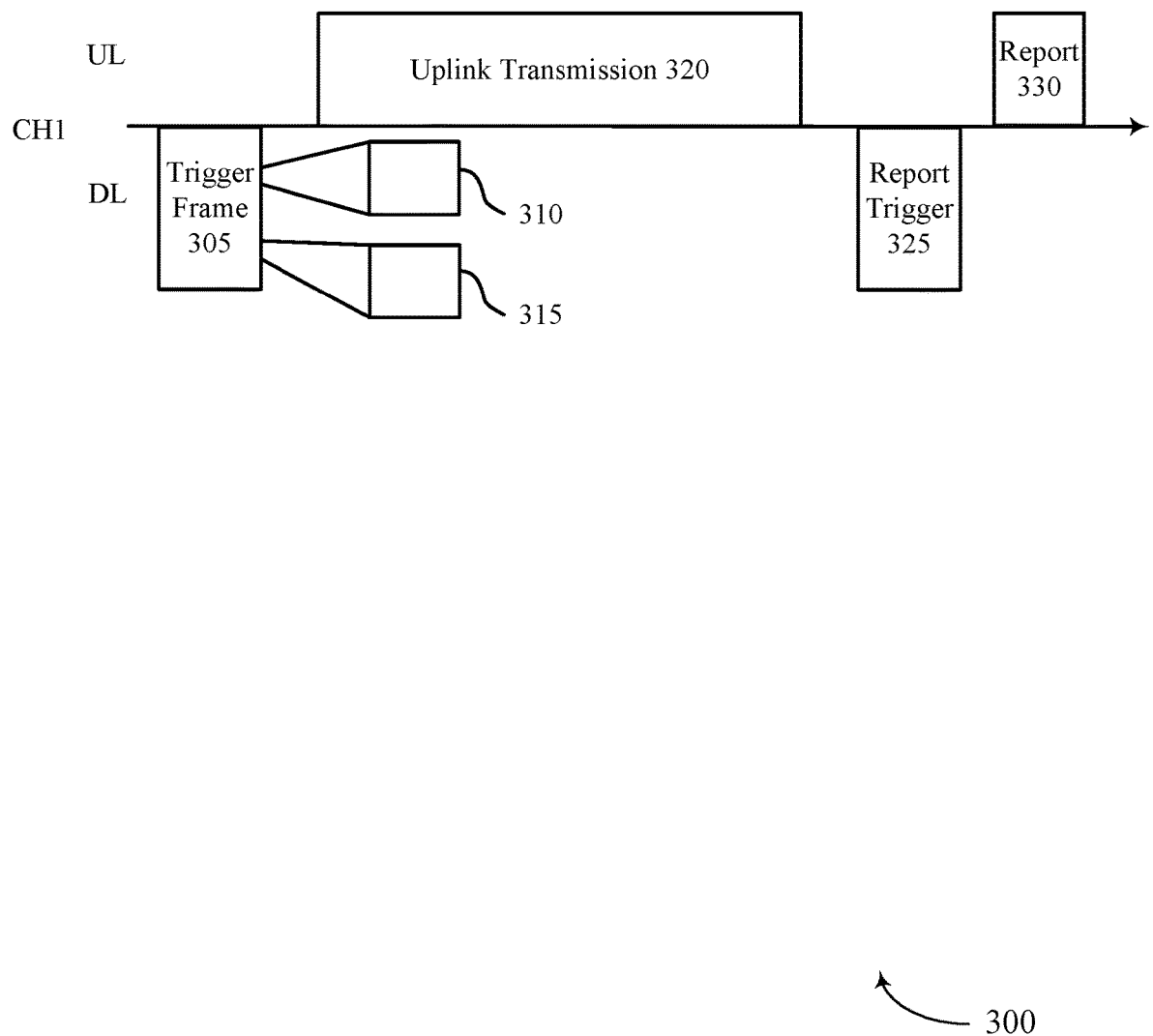
FIG. 3 illustrates an example of a single-channel communication timeline that supports soliciting in-BSS interference reports in accordance with aspects of the present disclosure.

FIG. 3 illustrates an example of a single-channel communication timeline 300 that supports soliciting in-BSS interference reports in accordance with aspects of the present disclosure. In some examples, single-channel communication timeline 300 may implement aspects of wireless communications system 200, and may be implemented by an AP 105 and one or more STAs 115, which may be examples of the corresponding devices described with reference to FIGS. 1 and 2.

In some examples, an AP 105 may solicit an uplink transmission from a first set of one or more STAs 115 and may instruct another set of one or more STAs 115 to monitor for interference during the uplink transmission. In some examples, the AP 105 may communicate with STAs 115 on a single channel.

AP 105 may transmit a downlink signal soliciting an uplink transmission by the one or more STAs 115. The downlink signal may be a frame, such as a trigger frame 305. The trigger frame 305 may include one or more fields, as described in greater detail with respect to FIG. 3. In some examples, trigger frame 305 may include a first message 310 and a second message 315. First message 310 may solicit an uplink transmission by the one or more STAs 115. Uplink transmission 320 may include, for example, one or more physical layer convergence procedure (PLCP) protocol data units (PPDUs). The one or more PPDUs may be high efficiency (HE) trigger based (TB) PPDUs. Upon receiving the first message 310 in trigger frame 305, the one or more STAs 115 in the first set of STAs 115 may send uplink transmission 320 on the RUs indicated in the first message 310 of trigger frame 305.

In some examples, the downlink signal (e.g., trigger frame 305) may include a second message 315. Second message 315 may not include any assignment of RUs. Instead, second message 315 may instruct an indicated STA 115 or a set of STAs 115 to monitor for interference during uplink transmission 320. In some examples, second message 315 may instruct a set of one or more STAs to monitor one or more indicated RUs, channels, or bands. Second message 315 may include a list of STAs 115 or an indication of a set of STAs 115. For instance, a STA 115 may be configured with a STA identifier, and may receive trigger frame 305 and listen for its STA identifier in the second message 315. In such examples, second message 315 may include a list of STA identifiers (e.g., 20 identifiers identifying 20 specific STAs 115). If one of the list of STA identifiers matches the STA identifier of a listening STA 115, then the listening STA 15 may determine that it has been instructed by the AP 105 to monitor for interference during uplink transmission 320. In some examples, a STA 115 may be configured (e.g., during association) with one or more group identifiers (e.g., set identifiers). In an illustrative example, a STA 115 may be configured with groups 50, 75, 100, and 125. If second message 315 includes any one of groups 50, 75, 100, or 125, then STA 115 may monitor for interference during uplink transmission 320. Alternatively, if the second message 315 does not include any of the groups to which STA 115 corresponds, then STA 115 may refrain from monitoring (e.g., may take no action based on trigger frame 305).

In some examples, AP 105 may transmit a report trigger 325, which triggers an interference report 330 from the STAs 115 or the set of STAs 115 indicated by second message 315. Report trigger 325 may be, for instance, a bandwidth query report poll (BQRP), or a channel quality information (CQI) trigger. In response to the report trigger 325, the one or more STAs 115 from the first set of STAs 115 (e.g., the STAs 115 indicated by second message 315) may transmit interference report 330. Interference report 330 may be a bandwidth query report (BQR) or a CQI report. Interference report 330 may indicate to AP 105 what interference was monitored during uplink transmission 320.

AP 105 may receive interference report 330, and may take one or more actions based thereon. For instance, AP 105 may group or regroup STAs 115, adjust an MCS, coordinate with other APs 105, identify transmit powers for subsequent communications, adjust subsequent scheduling of uplink or downlink communications, schedule simultaneous uplink and downlink communications with one or more STAs 115 (e.g., in a full duplex mode), enable clear request to send (RTS) clear to send (CTS) protocols (e.g., to protect transmissions from a STA 115 based on known interference), identify a hidden node, or the like.

In some examples, AP 105 may be capable of sharing a transmission opportunity (TxOP) with one or more neighbor APs 105 (not shown) to more efficiency utilize the medium. In such examples, a first AP 105 may need to determine both whether to share the TxOP, and which RUs to share with the neighbor AP 105 in the event that the two APs 105 do share the TxOP. In such cases, it may be desirable to determine what interference the neighbor AP 105 would cause by simultaneously transmitting during the TxOP, what interference STAs 115 not associated with the first AP 105 might cause to STAs 115 that are associated with the first AP 105, what interference the first AP 105 might cause to the neighbor AP 105, and what interference STA 115 associated with the first AP 105 may cause to STAs 115 not associated with the first AP 105. Thus, improved interference information for improving scheduling and AP coordination may be desirable.

For example, a neighbor AP 105 or one or more STAs 115 that are not associated with AP 105-a may be included in the first set of STAs 115. One or more AP 105 and one or more STAs 115 may be instructed, in the first message 310 to the first set of STAs 115, to send an uplink transmission 320. The first AP 105 may receive the feedback report from the second set of STAs, which may be monitoring as instructed in second message 315. In such examples, the first AP may determine whether the neighbor AP 105 or one or more of the STAs 115 not associated with the first AP 105 are sufficiently isolated from the first AP 105 (e.g., generate a low enough level of interference) to share the TxOP with the neighbor AP 105 or one or more STAs 115 not associated with the first AP. In some examples, the first AP 105 may determine which RUs to allocate to a neighbor AP 105 for a shared TxOP based on the reported feedback information from report 330.

Similarly, in some examples, first AP 105 may include a neighbor AP 105 or one or more STAs 115 that are not associated with the first AP 105 in the second set of STAs 115, and the second message instructing the second set of STAs 115 to monitor the medium during uplink transmission 320 may cause the neighbor AP 105 and one or more STAs 115 that are not associated with first AP 105 to monitor the medium. In such cases, the neighbor AP 105 and one or more of the STAs 115 not associated with the first AP 105 may monitor for interference and may send report 330 when triggered by report trigger 325. In such examples, the first AP may determine whether the neighbor AP 105 or one or more of the STAs 115 not associated with the first AP 105 are sufficiently isolated from the first AP 105 (e.g., generate a low enough level of interference) to share the TxOP with the neighbor AP 105 or one or more STAs 115 not associated with the first AP. In some examples, the first AP 105 may determine which RUs to allocate to a neighbor AP 105 for a shared TxOP based on the reported feedback information from report 330.

Figure 4:
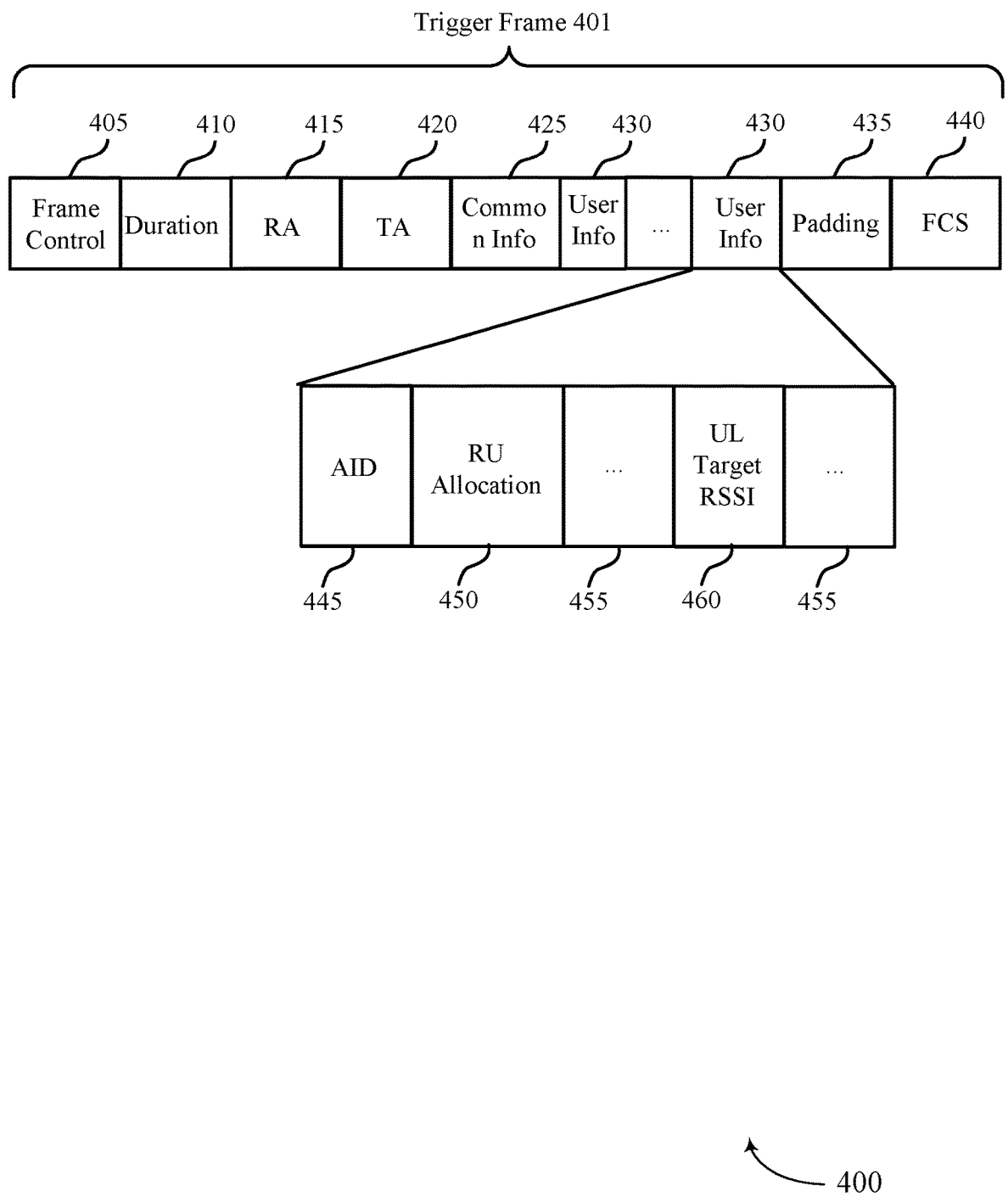
FIG. 4 illustrates an example of a frame structure that supports soliciting in-BSS interference reports in accordance with aspects of the present disclosure.

FIG. 4 illustrates an example of a frame structure 400 that supports soliciting in-BSS interference reports in accordance with aspects of the present disclosure. In some examples, frame structure 400 may implement aspects of wireless communications system 200, and may be implemented by an AP 105 and one or more STAs 115, which may be examples of the corresponding devices described with reference to FIGS. 1 and 2.

As described with respect to FIG. 3, a downlink signal including a first message and a second message may be a trigger frame 401. The trigger frame 401 may include MAC header fields, such as a frame control field 405, a duration field 410, a resource allocation field 415, and a transmitter address (TA) field. The trigger frame 401 may also include a common information field 425 with information common to all receiving STAs 115. The trigger frame 401 may also include one or more user information fields 430, a padding field 435 and a frame check sequence (FCS) field 440.

The one or more user information fields 420 may include one or more subfields. For example, the user information field 430 may include an uplink target RSSI field 460 (e.g., a subfield that indicates a target RSSI for uplink transmissions from a STA 115 indicated in an AID subfield 445). The user information field 430 may further include additional subfields 455. The user information field 430 may include an AID subfield 445. The AID subfield 445 may indicate a STA 115. The RU allocation subfield 450 may indicate one or more RUs for the STA 115 indicated by the AID subfield 445. In some examples, a first type of AID subfield 445 may indicate individual STAs 115 to which a message soliciting an uplink transmission is directed, and a corresponding RU allocation subfield 450 may indicate the one or more RUs on which the uplink transmission is to be transmitted by the STA 115. In such examples, a second type of AID subfield 445 may indicate a STA 115 for monitoring during an uplink transmission, and a corresponding RU allocation subfield 450 may indicate one or more RUs on which the indicated STA 115 is to monitor. In some examples, a first set of AID values for a single type of AID subfield 445 may be reserved for monitoring instructions, and second set of AID values for the same type of AID subfield 445 may be reserved for messages soliciting uplink transmissions. In such examples, if a STA 115 is identified by an AID of the first set of AID values, it may determine that it is to send an uplink transmission, and may do so on RUs indicated by RU allocation subfield 450. If the STA 115 is identified by an AID of the second set of AID values, then it may determine that it is to monitor RUs, and may do so on the RUs indicated by RU allocation subfield 450. In some examples, a first set of AID values may be reserved for sets of STAs 115 for monitoring. That is, if a particular set of STAs 115 is indicated by a reserved AID in AID subfield 445, then a STA 115 that is associated with that set of STAs 115 may monitor during the RUs indicated in RU allocation subfield 450. In some examples, RU allocation subfield 450 may indicate a particular RU or a set of RUs within a channel or a band. In some examples, RU allocation subfield 450 may indicate an entire band or a portion of a band (e.g., 20 MHz, 40 MHz, 80 MHz, or the like).

Figure 5:
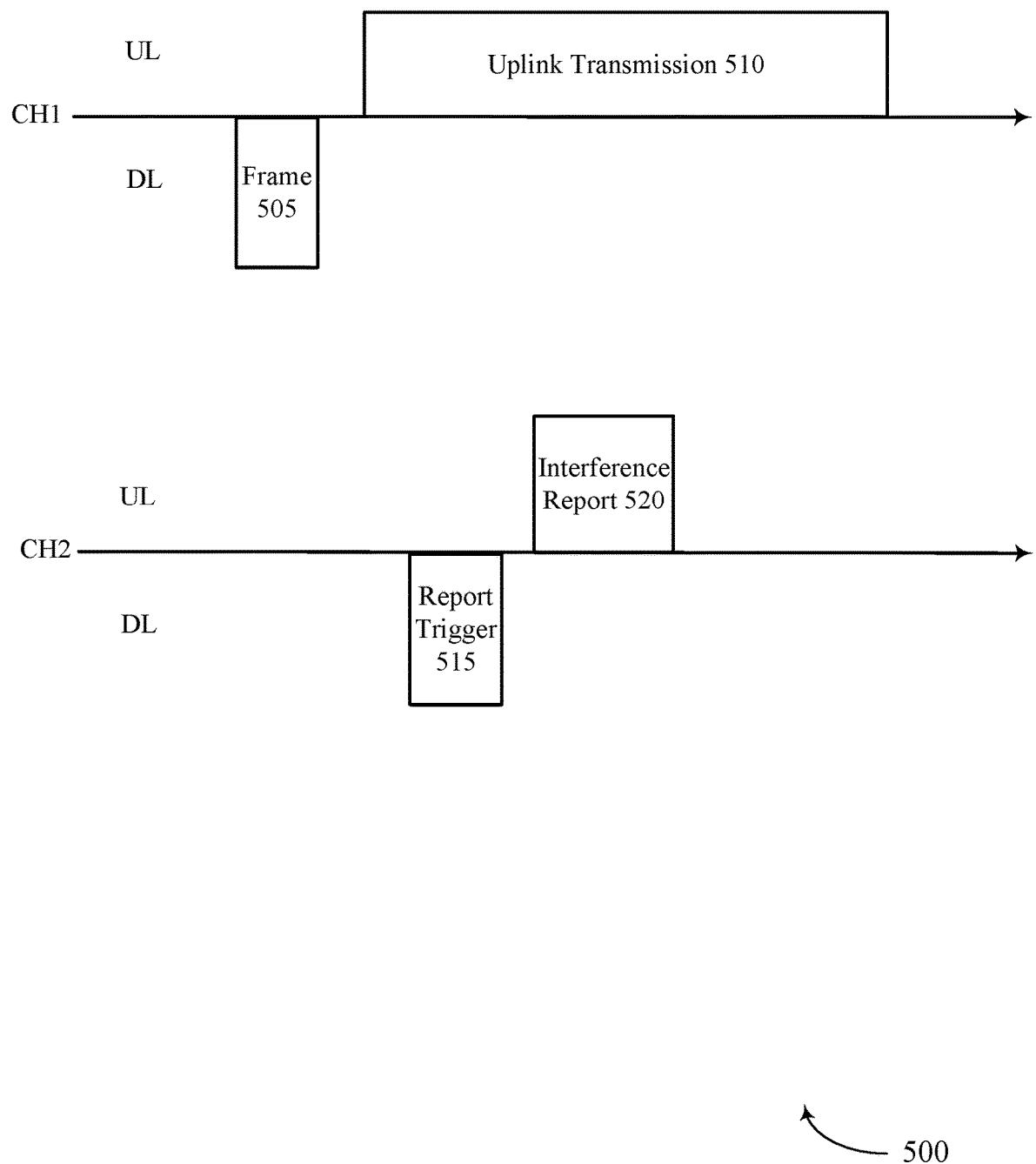
FIG. 5 illustrates an example of a multi-channel communication timeline that supports soliciting in-BSS interference reports in accordance with aspects of the present disclosure.

FIG. 5 illustrates an example of a multi-channel communication timeline 500 that supports soliciting in-BSS interference reports in accordance with aspects of the present disclosure. In some examples, multi-channel communication timeline 500 may implement aspects of wireless communications system 200, and may be implemented by an AP 105 and one or more STAs 115, which may be examples of the corresponding devices described with reference to FIGS. 1 and 2.

In some examples, an AP 105 may operate in a multi-channel mode. In such examples, AP 105 may communicate with one or more STAs 115 on multiple channels. AP 105 and STA 115 may send packets, from the same queue or pool, on either one of channel 1 or channel 2. Disparate packets from the same queue transmitted on channel 1 and channel 2 may be reassembled at the receiving device. In some examples, AP 105 may be configured to communicate on multiple bands (e.g., a 2.4 GHz band, a 5 GHz band, and a 6 GHz band). In some examples, one or more STAs 115 may be configured to operate on multiple bands (e.g., a 2.4 GHz band and a 5 GHz band, or a 5 GHz band and a 6 GHz band). In such examples, the AP 105 and the STAs 115 may communicate in a multi-channel mode (e.g., on the two channels on which the STAs 115 are capable of operating). In some examples, one channel may be a data channel and another channel may be a control channel. In some examples, data may be transmitted on one channel (e.g., channel 1) and feedback information may be communicated via another channel (e.g., channel 2).

In some examples, AP 105 may transmit a frame 505 to one or more STAs 115 over Channel 1. Frame 505 may be a frame such as that described with respect to FIG. 3. In some examples, frame 505 may be a trigger frame. Frame 505 may solicit an uplink transmission 510 from a first set of one or more STAs 115 on the first channel. Upon receiving the frame 505, one or more STAs 115 from the first set of one or more STAs 115 may send one or more uplink transmissions on RUs indicated by frame 505 on channel 1.

In some examples, AP 105 may transmit a report trigger 515 on channel 2. Report trigger 515 may trigger an interference report 520 on channel 2. The report trigger may be, for example, a BQRP, or a CQI trigger. Report trigger 515 may indicate a second set of one or more STAs 115, such that the second set of STAs 115 monitors for interference while the first set of STAs 115 sends uplink transmission 510. Report trigger 515 may be transmitted simultaneously with or after frame 505. In some examples, interference report 520 may be transmitted during uplink transmission 510. In some examples, AP 105 may transmit multiple second messages 315 during uplink transmission 510, and may receive interference reports 520, which may provide real time interference reports over time.

AP 105 may receive interference report 530, and may take one or more actions based thereon. For instance, AP 105 may group or regroup STAs 115, adjust an MCS, coordinate with other APs 105, identify transmit powers for subsequent communications, adjust subsequent scheduling of uplink or downlink communications, schedule simultaneous uplink and downlink communications with one or more STAs 115 (e.g., in a full duplex mode), enable clear request to send (RTS) clear to send (CTS) protocols (e.g., to protect transmissions from a STA 115 based on known interference), identify a hidden node, or the like.

AP 105 may receive interference report 520, and may take one or more actions based thereon. For instance, AP 105 may group or regroup STAs 115, adjust an MCS, coordinate with other APs 105, identify transmit powers for subsequent communications, adjust subsequent scheduling of uplink or downlink communications, schedule simultaneous uplink and downlink communications with one or more STAs 115 (e.g., in a full duplex mode), enable clear request to send (RTS) clear to send (CTS) protocols (e.g., to protect transmissions from a STA 115 based on known interference), identify a hidden node, or the like.

In some examples, AP 105 may be capable of sharing a transmission opportunity (TxOP) with one or more neighbor APs 105 (not shown) to more efficiency utilize the medium. In such examples, a first AP 105 may need to determine both whether to share the TxOP, and which RUs to share with the neighbor AP 105 in the event that the two APs 105 do share the TxOP. In such cases, it may be desirable to determine what interference the neighbor AP 105 would cause by simultaneously transmitting during the TxOP, what interference STAs 115 not associated with the first AP 105 might cause to STAs 115 that are associated with the first AP 105, what interference the first AP 105 might cause to the neighbor AP 105, and what interference STA 115 associated with the first AP 105 may cause to STAs 115 not associated with the first AP 105. Thus, improved interference information for improving scheduling and AP coordination may be desirable.

For example, a neighbor AP 105 or one or more STAs 115 that are not associated with AP 105-a may be included in the first set of STAs 115. One or more AP 105 and one or more STAs 115 may be instructed, in the frame 505 to the first set of STAs 115, to send an uplink transmission 510. The first AP 105 may receive the feedback report from the second set of STAs, which may be monitoring as instructed in second message report trigger 515. In such examples, the first AP may determine whether the neighbor AP 105 or one or more of the STAs 115 not associated with the first AP 105 are sufficiently isolated from the first AP 105 (e.g., generate a low enough level of interference) to share the TxOP with the neighbor AP 105 or one or more STAs 115 not associated with the first AP. In some examples, the first AP 105 may determine which RUs to allocate to a neighbor AP 105 for a shared TxOP based on the reported feedback information from report 330.

Similarly, in some examples, first AP 105 may include a neighbor AP 105 or one or more STAs 115 that are not associated with the first AP 105 in the second set of STAs 115, and the report trigger 515 instructing the second set of STAs 115 to monitor the medium during uplink transmission 510 may cause the neighbor AP 105 and one or more STAs 115 that are not associated with first AP 105 to monitor the medium. In such cases, the neighbor AP 105 and one or more of the STAs 115 not associated with the first AP 105 may monitor for interference and may send report 330 when triggered by report trigger 515. In such examples, the first AP may determine whether the neighbor AP 105 or one or more of the STAs 115 not associated with the first AP 105 are sufficiently isolated from the first AP 105 (e.g., generate a low enough level of interference) to share the TxOP with the neighbor AP 105 or one or more STAs 115 not associated with the first AP. In some examples, the first AP 105 may determine which RUs to allocate to a neighbor AP 105 for a shared TxOP based on the reported feedback information from report 330.

Figure 6:
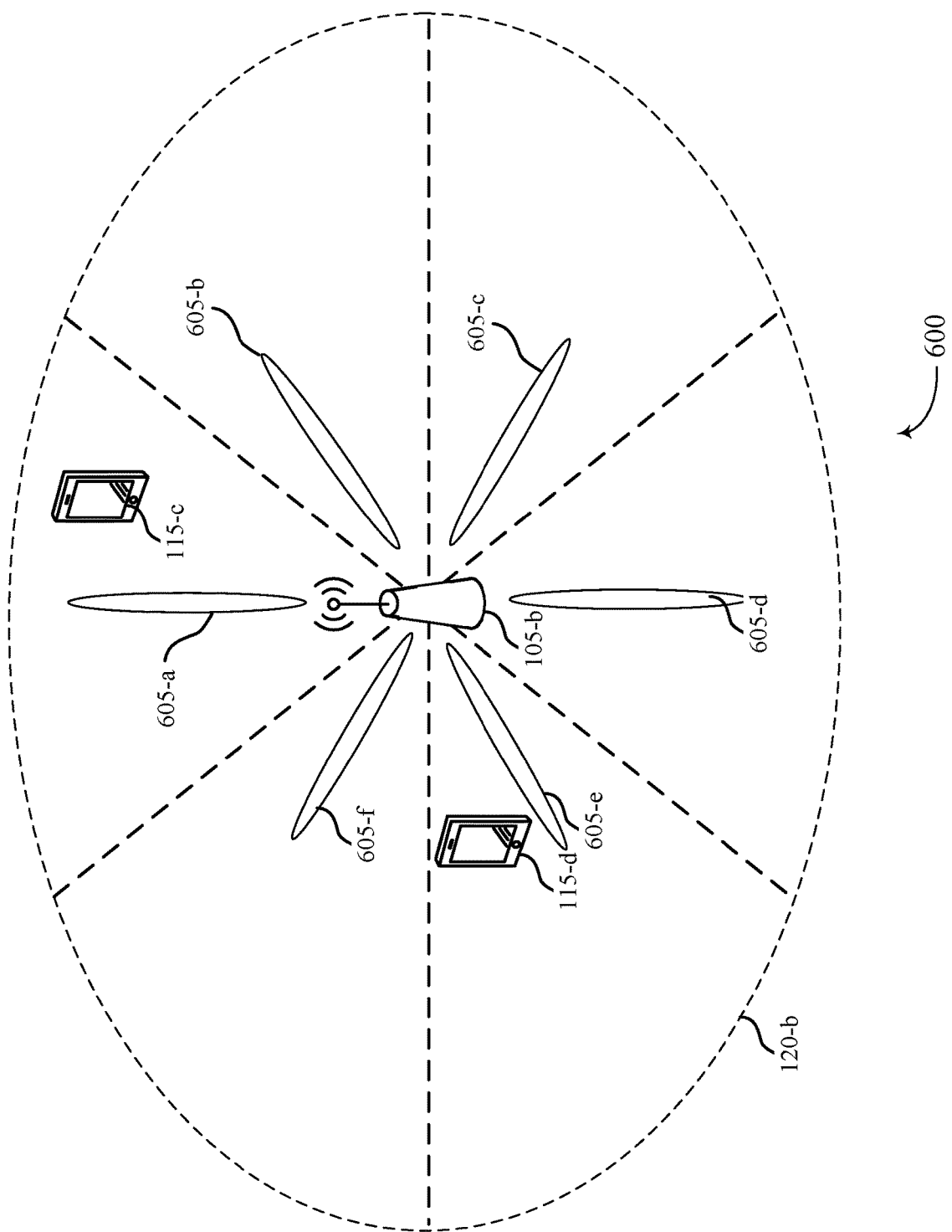
FIG. 6 illustrates an example of a wireless communications system that supports soliciting in-BSS interference reports in accordance with aspects of the present disclosure.

FIG. 6 illustrates an example of a wireless communications system 600 that supports soliciting in-BSS interference reports in accordance with aspects of the present disclosure. In some examples, wireless communications system 600 may implement aspects of wireless communications system 200, and may include an AP 105-b and a STA 115-c and a STA 115-d, which may be examples of the corresponding devices described with reference to FIGS. 1 and 2.

In some examples, an AP 105-b may gather interference information in the form of signal to noise ratio SNR information. AP 105-c may divide a geographic coverage area 120-b into multiple sectors (e.g., six sectors). For instance, STA 115-a may be located in a first sector that is a portion of geographic coverage area 120-b, and STA 115-a may be located in a fifth sector. In some examples, the angular width of each sector may be selected depending on the sophistication and complexity involved. For instance, narrow sectors may provide higher accuracy, but may increase computational complexity. An AP 105-*b* or a STA 115 may indicate support for various levels of complexity, and AP 105-*b* may define the sectors based thereon.

AP 105-*b* may send a series of training signals 605. In some examples, AP 105-*c* may send training signals 605 on different sets of directional antenna. The training signals 605 may therefore be directional, and AP 105-*b* may sweep through 360 degrees, transmitting one directional training signal 605 for each sector. AP 105 may, instruct STAs 115 to monitor the directional signals, and transmit SNR reports at different times. The different times may correspond to the timing of each directional training signal 605. For example, AP 105-*b* may transmit directional training signal 605-*a* at a first time, directional training signal 605-*b* at a second time, directional training signal 605-*c* at a third time, directional training signal 605-*d* at a fourth time, directional training signal 605-*e* at a fifth time, and directional training signal 605-*f* at a sixth time. In some examples, AP 105-*b* may instruct each of STA 115-*c*, and STA 115-*d* (and any other served STAs 115) to measure SNR and send an SNR report indicating SNR at the first time, the second time, the third time, etc. Thus, each STA 115 may report SNR on a per sector basis.

AP 105-*b* may receive the SNR reports from STA 115-*c* and may co-relate (e.g., compare) the SNR from each STA 115 for each sector. AP 105-*b* may determine which STAs can or cannot be grouped together based thereon. In some examples, AP 105-*c* may adjust current grouping, adjust an MCS, identify a hidden node, and perform half duplex, full duplex, or other types of scheduling, or perform other actions based on the SNR reports and the SNR matrix. For instance, STA 115-*d* may be located closer to AP 105-*b* than STA 115-*c*. STA 115-*d* may measure and report a high SNR for directional training signals 605-*d*, 605-*e*, and 605-*f*. However, STA 115-*c* may measure and report a low SNR for directional training signal 605-*a*. AP 105-*b* may, for example, group STA 115-*c* in a first set of STAs 115 and STA 115-*d* in a second set of STAs. In some examples, AP 105-*b* may receive an uplink transmission from 115-*c* and send a simultaneous downlink transmission to STA 115-*d* in a full duplex mode, based on the SNR reports.

In some examples, AP 105-*b* may be capable of sharing a transmission opportunity (TxOP) with one or more neighbor APs 105 (not shown) to more efficiency utilize the medium. In such examples, an AP 105 may need to determine both whether to share the TxOP, and which RUs to share with the neighbor AP 105 in the event that the two APs 105 do share the TxOP. In such cases, it may be desirable to determine what interference the neighbor AP 105 would cause by simultaneously transmitting during the TxOP, what interference STAs 115 not associated with the AP 105-*b* might cause to STAs 115 that are associated with the AP 105-*b*, what interference the AP 105-*b* might cause to the neighbor AP 105, and what interference STA 115 associated with the AP 105-*b* may cause to STAs 115 not associated with the AP 105-*b*. Thus, improved interference information for improving scheduling and AP coordination may be desirable.

For example, a neighbor AP 105 or one or more STAs 115 that are not associated with AP 105-*a* may receive one or more directional training signals 605. Each neighbor AP 105 or STA 115 not associated with AP 105-*b* may receive the directional training signal 605, and may transmit an SNR report. AP 105-*b* may include these STAs 115 not associated with AP 105-*b* and any responding neighbor APs 105 in the SNR matrix. With this information, base station 105-*b* may determine whether the neighbor AP 105 or one or more of the STAs 115 not associated with the AP 105-*b* are sufficiently isolated from the AP 105-*b* (e.g., generate a low enough level of interference) to share the TxOP with the neighbor AP 105 or one or more STAs 115 not associated with the first AP. In some examples, the AP 105-*b* may determine which RUs to allocate to a neighbor AP 105 for a shared TxOP based on the reported feedback information from report 330.

Figure 7:
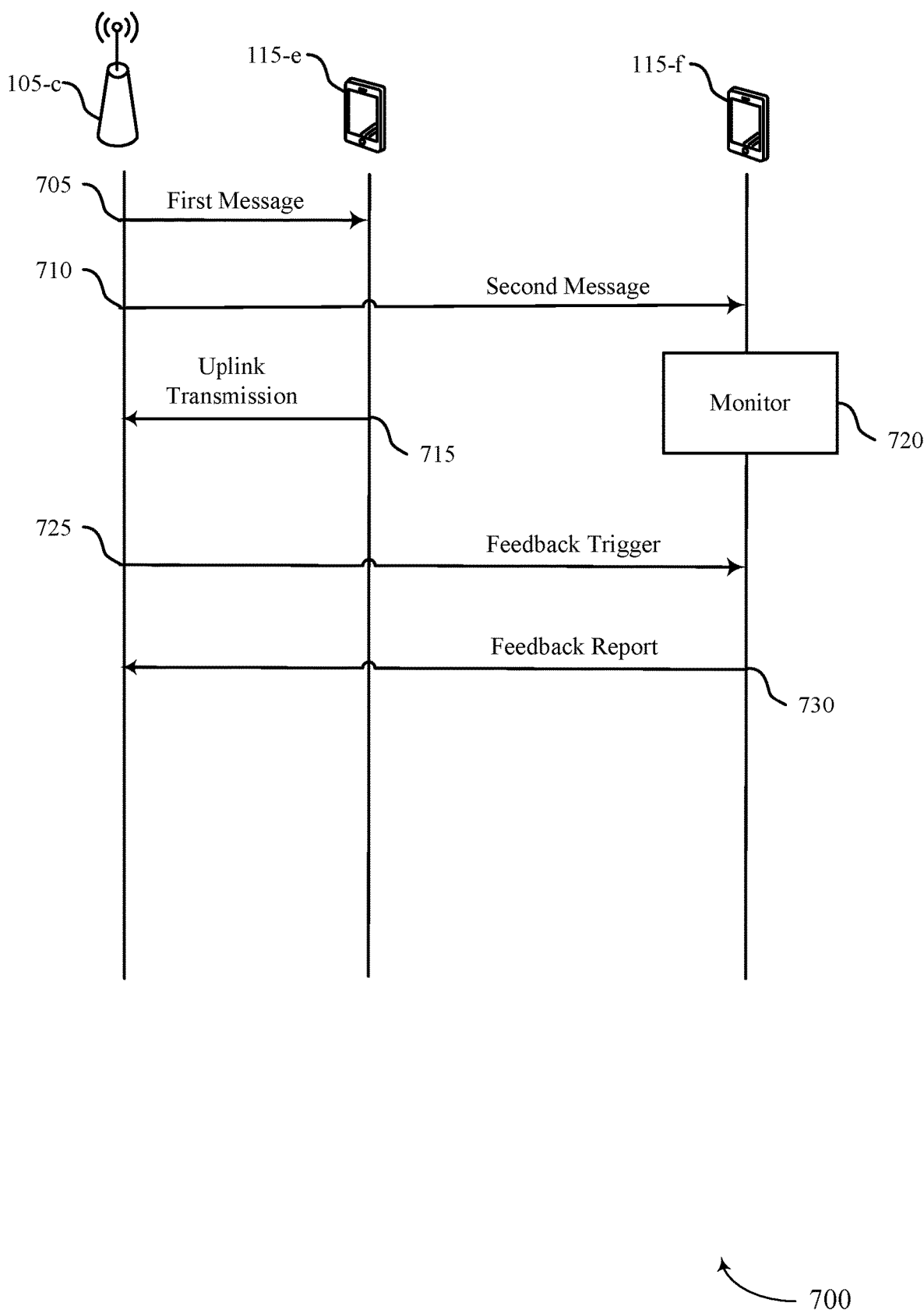
FIG. 7 illustrates an example of a process flow that supports soliciting in-BSS interference reports in accordance with aspects of the present disclosure.

FIG. 7 illustrates an example of a process flow 700 that supports soliciting in-BSS interference reports in accordance with aspects of the present disclosure. In some examples, process flow 700 may implement aspects of wireless communications system 200, and the process flow 700 may be implemented by an AP 105-*c*, a STA 115-*e* and a STA 115-*f*, which may be examples of the corresponding devices described with reference to FIGS. 1 and 2.

At 705, AP 105-*c* may transmit a first message. The first message may be transmitted to a first set of one or more STAs 115 including STA 115-*e*. In some examples, the first message may solicit an uplink transmission from the STAs 115 in the first set of one or more STAs 115.

At 710, AP 105-*c* may transmit a second message to a second set of one or more STAs 115 including STA 115-*f*. In some examples, the second message may include an instruction to monitor the wireless channel for interference during the uplink transmission by the first set of one or more STAs 115. In one example, the first message and the second message may be transmitted on a first channel. The first message and the second messages may be part of the same frame (e.g., a trigger frame). In some examples, AP 105-*c* may transmit the first message on a first channel, and the second message on a second channel. In such examples, AP 105-*c* may receive an uplink transmission 715 on the first channel, and may receive a feedback report at 730 on the second channel. In such examples, the second message and the feedback trigger may be the same message.

At 715, STA 115-*e* may monitor for interference resulting from an uplink transmission at 715 from the first set of STAs 115. At 725, STA 115-*f* may receive from AP 105-*c* a feedback trigger that triggers a feedback report at 730. The feedback trigger may be a BQRP or a CQI trigger, and the feedback report at 730 may be a BQR or a CQI report.

In some examples, AP 105-*c* may adjust a communication parameter based on the interference report (e.g., adjust an MCS, an RU size, or an RU allocation). In some examples, the adjustment may be based on identifying a hidden nose. In some examples, AP 105-*c* may generate or modify one or more sets of STAs 115.

Figure 8:
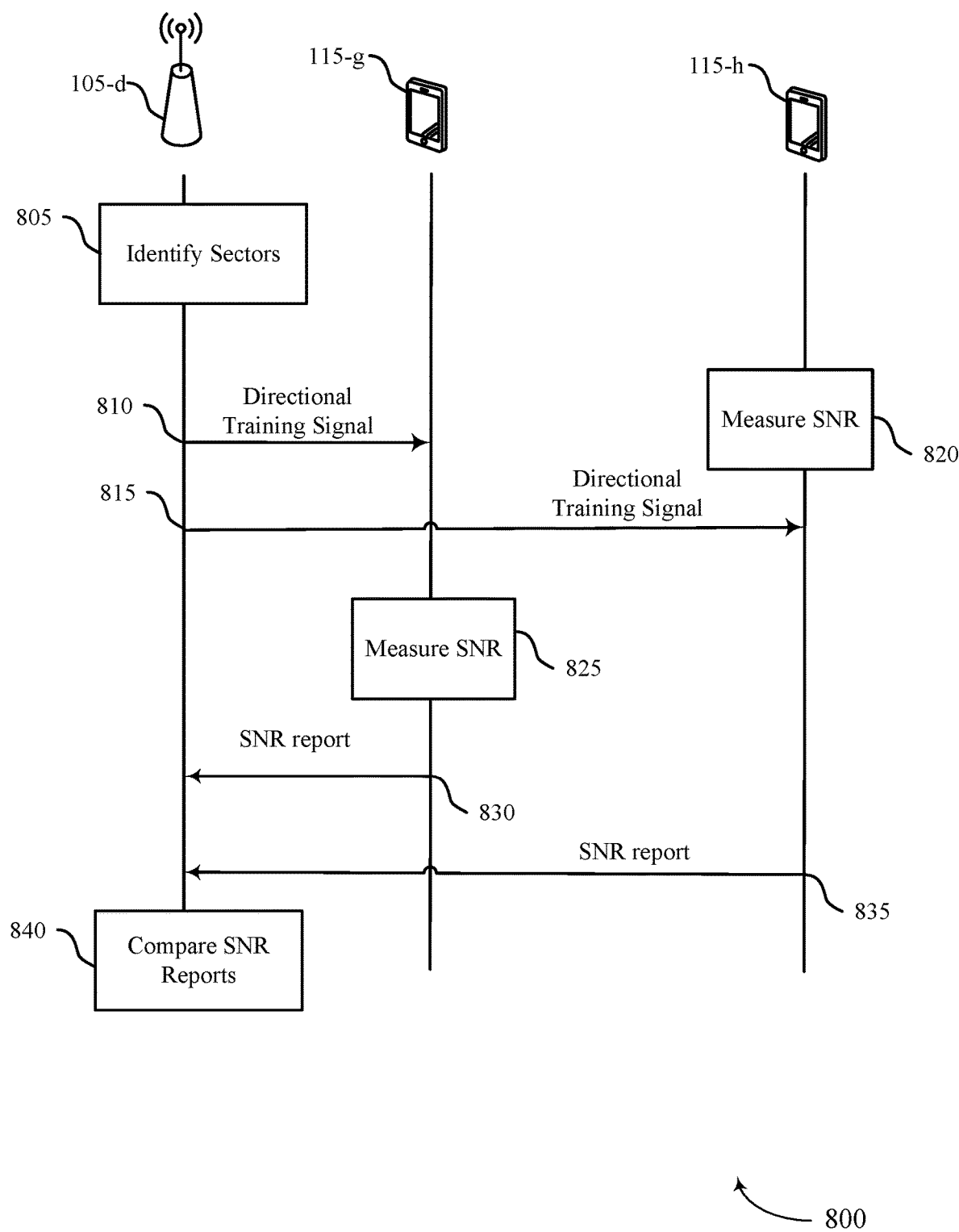
FIG. 8 illustrates an example of a process flow that supports soliciting in-BSS interference reports in accordance with aspects of the present disclosure.

FIG. 8 illustrates an example of a process flow 800 that supports soliciting in-BSS interference reports in accordance with aspects of the present disclosure. In some examples, process flow 800 may implement aspects of wireless communications system 200, and may be implemented by an AP 105-*c*, a STA 115-*g* and a STA 115-*h*, which may be examples of the corresponding devices described with reference to FIGS. 1 and 2.

At 805, AP 105-*d* may identify a set of sectors. The sectors may be a subset of coverage areas of a geographic coverage area corresponding to AP 105-*d*. In some examples, AP 105-*d* may identify a computational complexity threshold for the AP, and may determine an angular width for each of the subset of coverage areas based at least in part on the identified computational complexity threshold.

At 810 and 815, AP 105-*d* may transmit one or more directional training signals for each of the sectors. For instance, if the coverage area is divided into six sectors, then at 810, AP 105-*d* may transmit six directional training signals in six directional corresponding to the six sectors. If there are two sectors, then AP 105-*d* may transmit a first directional training signal at 710 and a second directional training signal at 815.

At 820 and 825, STA 115-*g* and STA 115-*h* may measure SNR for each directional training signal. For instance, if AP 105-*d* sweeps through the entire coverage area and transmits six directional training signals, then STA 151-*e* and STA 115-*f* will take six SNR measurements (one for each training signal).

At 830, STA 115-*g* may transmit an SNR report, and at 835, STA 115-*h* may transmit an SNR report. In some examples, STA 115-*g* and STA 115-*h* may transmit a single SNR report including SNR reports on a per sector basis. In other examples, STA 115-*g* and STA 115-*h* may transmit individual SNR reports corresponding to each individual received directional training signal.

At 840, AP 105-*d* may compare the received SNR reports. In some examples, AP 105-*d* may generate an SNR matrix for each station located within the geographic coverage area with respect to each sector. In some examples, AP 105-*d* may adjust a communication parameter based on the SNR reports. For instance, the AP 105-*d* may adjust an MCS, an RU size, or an RU allocation based on the received SNR reports. In some examples, AP 105-*d* may identify a hidden node, or may generate one or more sets of STAs 115.

Figure 9:
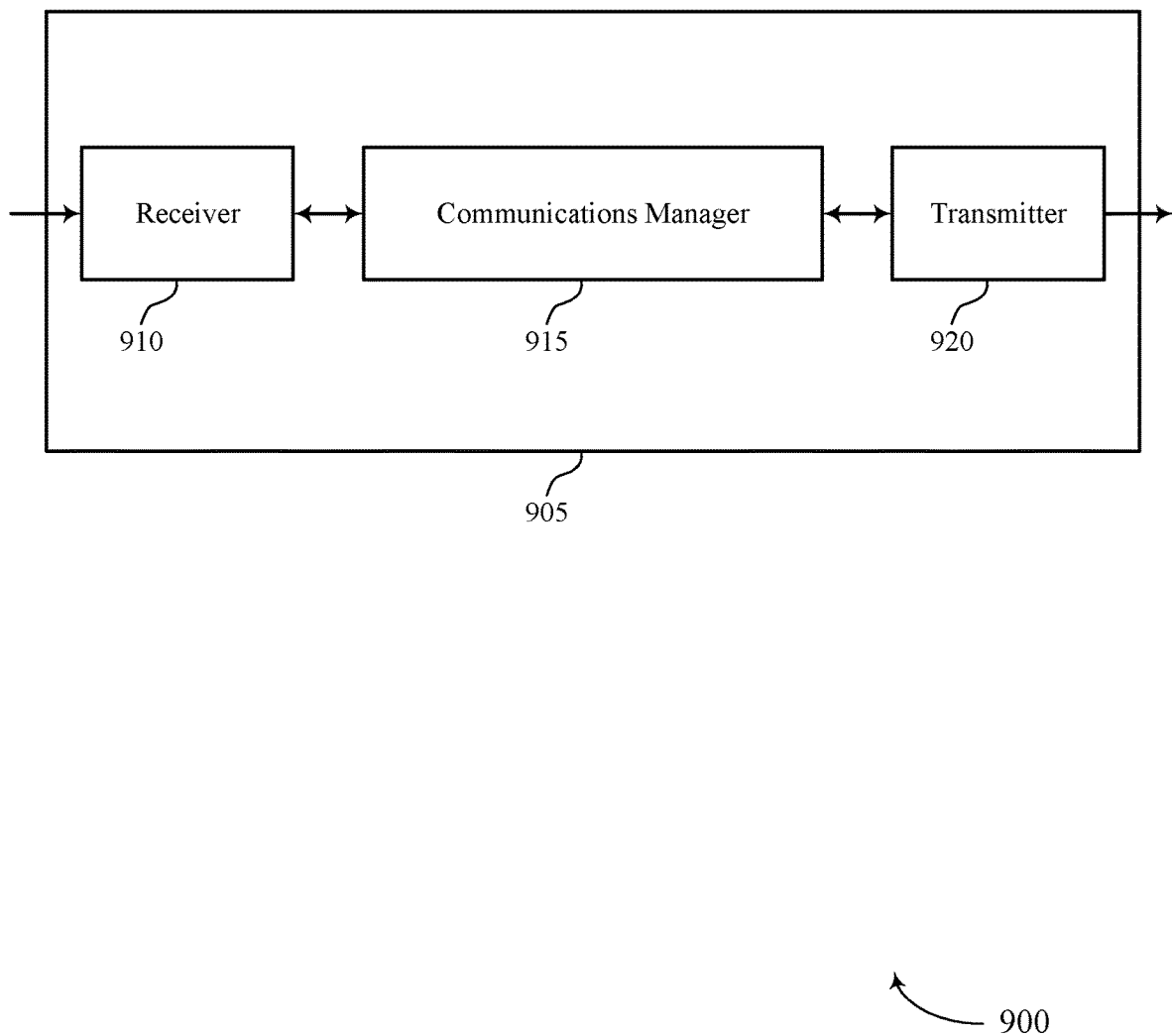
FIGS. 9 and 10 show block diagrams of devices that support soliciting in-BSS interference reports in accordance with aspects of the present disclosure.

FIG. 9 shows a block diagram 900 of a device 905 that supports soliciting in-BSS interference reports in accordance with aspects of the present disclosure. The device 905 may be an example of aspects of an AP as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to soliciting in-BSS interference reports, etc.). Information may be passed on to other components of the device. The receiver 910 may be an example of aspects of the transceiver 1220 described with reference to FIG. 12. The receiver 910 may utilize a single antenna or a set of antennas.

The communications manager 915 may transmit to a first set of one or more STAs a first message soliciting an uplink transmission by the first set of one or more STAs over a wireless channel, transmit to a second set of one or more STAs a second message including an instruction to monitor the wireless channel for interference during the uplink transmission by the first set of one or more STAs, transmit to the second set of one or more STAs a third message triggering an interference report, and receive, from the second set of one or more STAs, an interference report based on the second message and the third message. The communications manager 915 may also identify a plurality of sectors of a geographic coverage area corresponding to the AP, transmit a set of one or more directional training signals, each of the set of one or more directional training signals corresponding to a sector of the plurality of sector, receive, based on the set of one or more directional training signals, a signal to noise ratio SNR report from a set of one or more stations located from a set of one or more stations located within the geographic coverage area, compare the received SNR reports for each station on a per sector basis, and adjust a communication parameter based on the comparing. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be implemented as a wireless modem chipset, and the transmitter 920 and the receiver 910 may be implemented as a set of analog components (e.g., amplifiers, filters, phase shifters, etc.) that are controlled by the communications manager 915 to transmit and receive signals, respectively. The communications manager 915 may couple with the receiver 910 over a receive interface and with the transmitter 920 over a transmit interface.

The communications manager 915 as described herein may be implemented to realize one or more potential advantages. One implementation may allow the device 905 to more efficiently coordinate in-BSS transmissions. For example, the device 905 may adjust an MCS or a grouping of STAs based on received interference information.

Based on implementing the in-BSS transmission mechanism techniques as described herein, a processor of a AP 105 (e.g., controlling the receiver 910, the transmitter 920, or the transceiver 1220 as described with reference to FIGS. 9 and 12 respectively) may be used more efficiently based on coordination of BSS. For example, because BSS may be coordinated based on the implementations descried herein, processing resources of an AP 105 may not be wasted on retransmissions due to signal interference between STAs 115 within a BSS.

Figure 10:
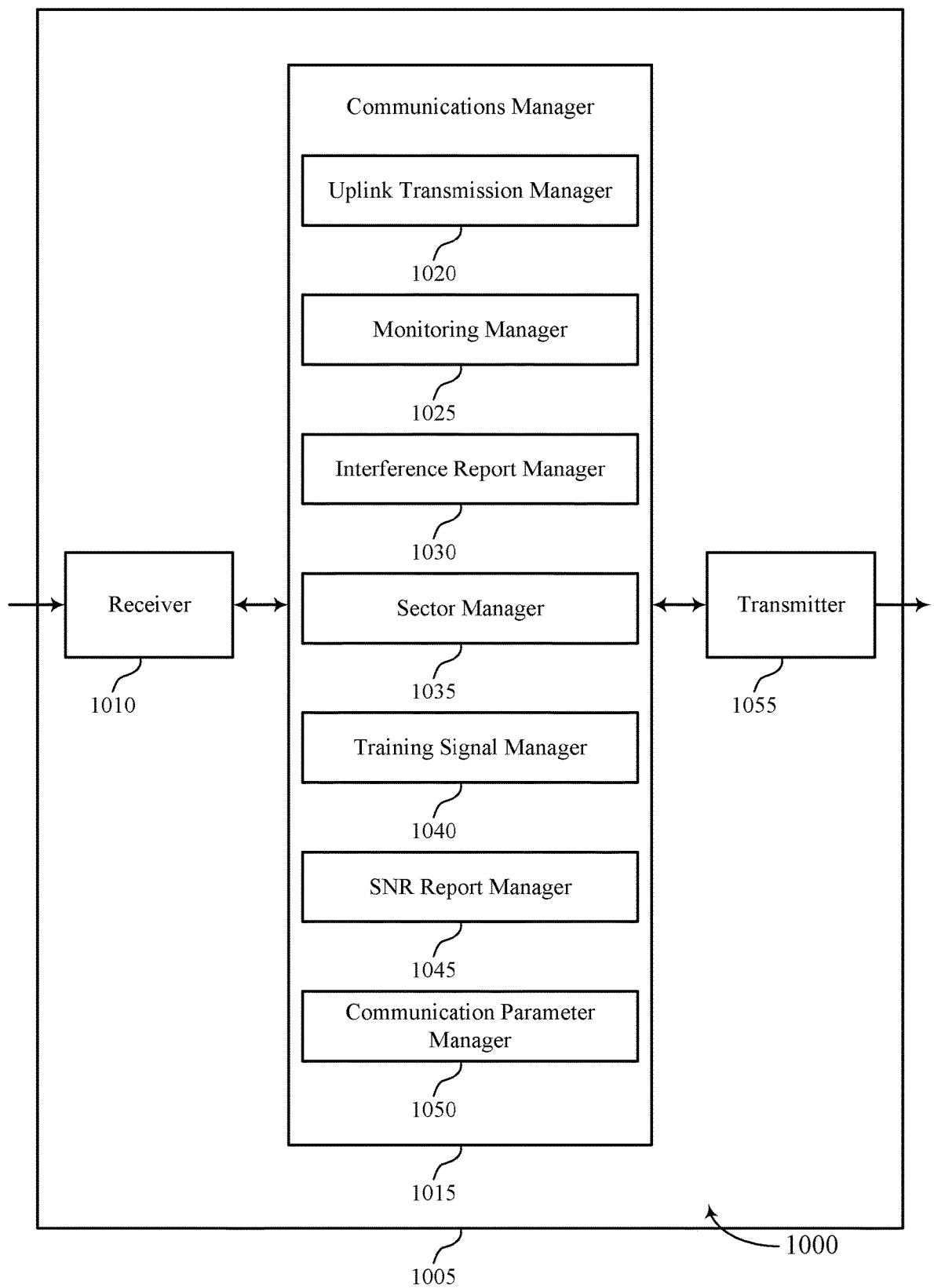

FIG. 10 shows a block diagram 1000 of a device 1005 that supports soliciting in-BSS interference reports in accordance with aspects of the present disclosure. The device 1005 may be an example of aspects of a device 905 or an AP 105 as described herein. The device 1005 may include a receiver 1010, a communications manager 1015, and a transmitter 1055. The device 1005 may also include a processor. Each of these components may be in communication with one another (e.g., via one or more buses).

The receiver 1010 may receive information such as packets, user data, or control information associated with various information channels (e.g., control channels, data channels, and information related to soliciting in-BSS interference reports, etc.). Information may be passed on to other components of the device. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an uplink transmission manager 1020, a monitoring manager 1025, an interference report manager 1030, a sector manager 1035, a training signal manager 1040, a SNR report manager 1045, and a communication parameter manager 1050. The communications manager 1015 may be an example of aspects of the communications manager 1210 described herein.

The uplink transmission manager 1020 may transmit to a first set of one or more STAs a first message soliciting an uplink transmission by the first set of one or more STAs over a wireless channel. The monitoring manager 1025 may transmit to a second set of one or more STAs a second message including an instruction to monitor the wireless channel for interference during the uplink transmission by the first set of one or more STAs.

The interference report manager 1030 may transmit to the second set of one or more STAs a third message triggering an interference report and receive, from the second set of one or more STAs, an interference report based on the second message and the third message. The sector manager 1035 may identify a plurality of sectors of a geographic coverage area corresponding to the AP.

The training signal manager 1040 may transmit a set of one or more directional training signals, each of the set of one or more directional training signals corresponding to a sector of the plurality of sectors. The SNR report manager 1045 may receive, based on the set of one or more directional training signals, a signal to noise ratio SNR report from a set of one or more stations located within the geographic coverage area and compare the received SNR reports for each station on a per sector basis.

The communication parameter manager 1050 may adjust a communication parameter based on the comparing. The transmitter 1055 may transmit signals generated by other components of the device. In some examples, the transmitter 1055 may be collocated with a receiver 1010 in a transceiver module. For example, the transmitter 1055 may be an example of aspects of the transceiver 1220 described with reference to FIG. 12. The transmitter 1055 may utilize a single antenna or a set of antennas.

In some examples, the communications manager 1015 may be implemented as a wireless modem chipset, and the transmitter 1055 and the receiver 1010 may be implemented as a set of analog components (e.g., amplifiers, filters, phase shifters, etc.) that are controlled by the communications manager 1015 to transmit and receive signals, respectively. The communications manager 1015 may couple with the receiver 1010 over a receive interface and with the transmitter 1055 over a transmit interface.

Figure 11:
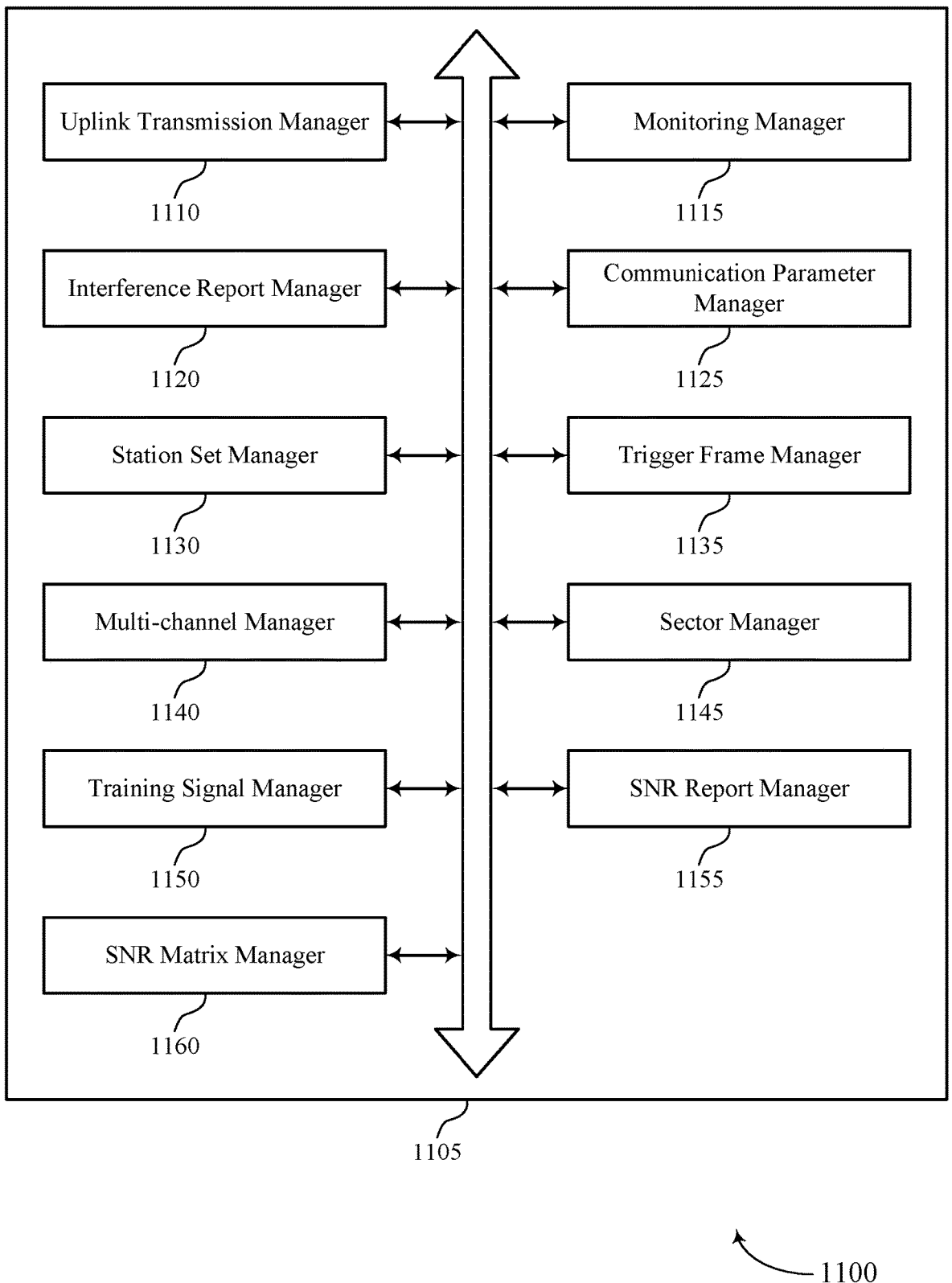
FIG. 11 shows a block diagram of a communications manager that supports soliciting in-BSS interference reports in accordance with aspects of the present disclosure.

FIG. 11 shows a block diagram 1100 of a communications manager 1105 that supports soliciting in-BSS interference reports in accordance with aspects of the present disclosure. The communications manager 1105 may be an example of aspects of a communications manager 915, a communications manager 1015, or a communications manager 1210 described herein. The communications manager 1105 may include an uplink transmission manager 1110, a monitoring manager 1115, an interference report manager 1120, a communication parameter manager 1125, a station set manager 1130, a trigger frame manager 1135, a multi-channel manager 1140, a sector manager 1145, a training signal manager 1150, a SNR report manager 1155, and a SNR matrix manager 1160. Each of these modules may communicate, directly or indirectly, with one another (e.g., via one or more buses).

The uplink transmission manager 1110 may transmit to a first set of one or more STAs a first message soliciting an uplink transmission by the first set of one or more STAs over a wireless channel. In some examples, transmitting the first message includes transmitting a first portion of a first frame including the first message. In some cases, the first portion of the first trigger frame includes a first user information field including a list of station identifiers corresponding to the first set of one or more STAs or a group identifier identifying the first set of one or more STAs. In some examples, the second set of one or more stations comprises one or more of: a station associated with the access point, a station not associated with the access point, or a second access point. In some examples, transmission manager 1110 may selectively allocating resources of a transmission opportunity to the second access point for a multi-access point coordinated transmission based at least in part on the interference report.

The monitoring manager 1115 may transmit to a second set of one or more STAs a second message including an instruction to monitor the wireless channel for interference during the uplink transmission by the first set of one or more STAs. In some examples, transmitting the second message includes transmitting a second portion of the first frame including the second message. In some cases, the second portion of the trigger frame includes a second user information field including a list of station identifiers corresponding to the second set of one or more STAs or a group identifier identifying the second set of one or more STAs. In some cases, instructions to monitor the wireless channel further include instructions to monitor one or more of: a transmission band, a set of one or more subchannels, or a group of resource units (RUs). In some examples, the first set of one or more stations may include one or more of: a station associated with the access point, a station not associated with the access point, or a second access point. In some examples, monitoring manager 1115 may selectively allocate resources of a transmission opportunity to the second access point for a multi-access point coordinated transmission based at least in part on the interference report.

The interference report manager 1120 may transmit to the second set of one or more STAs a third message triggering an interference report. In some examples, the interference report manager 1120 may receive, from the second set of one or more STAs, an interference report based on the second message and the third message. In some examples, the interference report manager 1120 may transmit a set of feedback report polls subsequent to the first feedback report poll. In some examples, the interference report manager 1120 may receive a set of feedback reports based on the set of feedback report polls, the set of feedback reports providing real time interference information during the uplink transmission. In some cases, the third message includes a BQRP or a CQI report trigger. In some cases, the second message and the third message are included in a first feedback report poll. In some cases, the feedback report poll includes one of a BQRP or a CQI trigger.

The communication parameter manager 1125 may adjust a communication parameter based on the comparing. In some examples, the communication parameter manager 1125 may adjust a communication parameter based on the interference report. In some examples, the communication parameter manager 1125 may identify a hidden node, and adjusting the communication parameter is based on the identifying. In some cases, the communication parameter includes one or more of an MCS, an RU size, or an RU allocation.

In some cases, the communication parameter includes one or more of an MCS, a RU size, or an RU allocation.

The sector manager 1145 may identify a plurality of sectors of a geographic coverage area corresponding to the AP. In some examples, the sector manager 1145 may identify a computational complexity threshold for the AP. In some examples, the sector manager 1145 may determine an angular width for each sector based on the identified computational complexity threshold.

The training signal manager 1150 may transmit a set of one or more directional training signals, each of the set of one or more directional training signals corresponding to a sector of the plurality of sectors.

The SNR report manager 1155 may receive, based on the set of one or more directional training signals, a signal to noise ratio SNR report from a set of one or more stations located within the geographic coverage area. In some examples, the SNR report manager 1155 may compare the received SNR reports for each of the set of one or more stations. The station set manager 1130 may modify, based on the interference report, one or more of: the first set of one or more STAs or the second set of one or more STAs. In some examples, the station set manager 1130 may generate, based on the interference report, a third set of one or more STAs. In some examples, the station set manager 1130 may modify, based on the comparing, one or more sets of one or more STAs. In some examples, the station set manager 1130 may generate, based on the interference report, one or more sets of STAs. In some examples, the access point is a first access point and the set of one or more stations for each sector comprises one or more of: a station associated with the access point, a station not associated with the access point, or a second access point. In some examples, the station set manager 1130 may selectively allocate resources of a transmission opportunity to the second access point for a multi-access point coordinated transmission based at least in part on the received SNR reports.

The trigger frame manager 1135 may determine that the first frame is a trigger frame, and may send the trigger frame. The multi-channel manager 1140 may transmit the first message on a first channel and transmitting the second message on a second channel. The SNR matrix manager 1160 may generate an SNR matrix for each station located within the geographic coverage area with respect to each sector, where adjusting the communication parameter is based on the SNR matrix.

Figure 12:
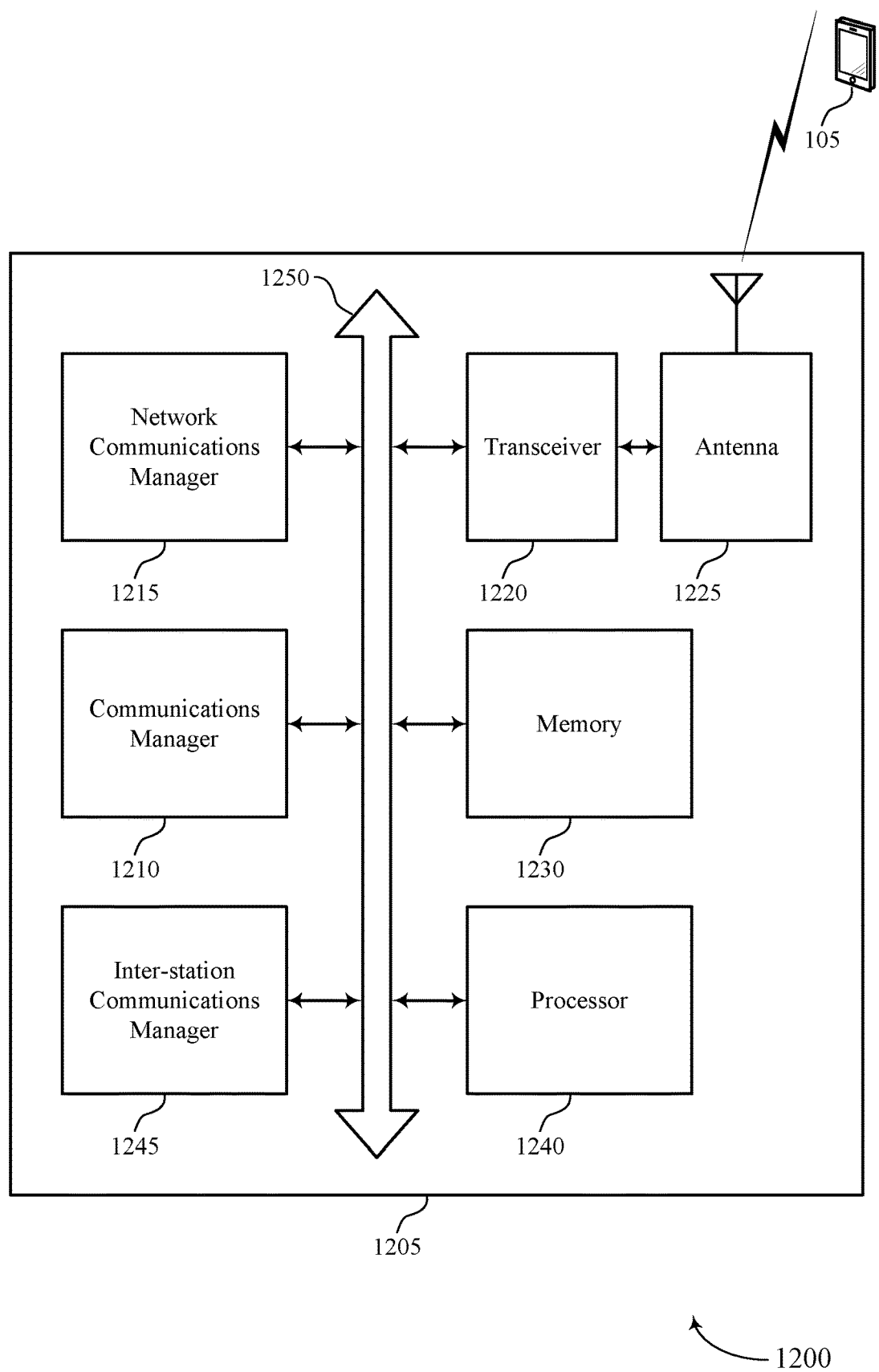
FIG. 12 shows a diagram of a system including a device that supports soliciting in-BSS interference reports in accordance with aspects of the present disclosure.

FIG. 12 shows a diagram of a system 1200 including a device 1205 that supports soliciting in-BSS interference reports in accordance with aspects of the present disclosure. The device 1205 may be an example of or include the components of device 905, device 1005, or an AP as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit to a first set of one or more STAs a first message soliciting an uplink transmission by the first set of one or more STAs over a wireless channel, transmit to a second set of one or more STAs a second message including an instruction to monitor the wireless channel for interference during the uplink transmission by the first set of one or more STAs, transmit to the second set of one or more STAs a third message triggering an interference report, and receive, from the second set of one or more STAs, an interference report based on the second message and the third message. The communications manager 1210 may also identify a plurality of sectors of a geographic coverage area corresponding to the AP, transmit a set of one or more directional training signals, each of the set of one or more directional training signals corresponding to a sector of the plurality of sectors, receive, based on the set of one or more directional training signals, a signal to noise ratio SNR report from a set of one or more stations located within the geographic coverage area, compare the received SNR reports for each station of the set of one or more stations, and adjust a communication parameter based on the comparing.

The network communications manager 1215 may manage communications with the core network (e.g., via one or more wired backhaul links). For example, the network communications manager 1215 may manage the transfer of data communications for client devices, such as one or more STAs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 12 35 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into processor 1240. The processor 1240 may be configured to execute computer-readable instructions stored in a memory to perform various functions (e.g., functions or tasks supporting soliciting in-BSS interference reports).

The inter-station communications manager 1245 may manage communications with other AP 105, and may include a controller or scheduler for controlling communications with STAs 115 in cooperation with other APs 105. For example, the inter-station communications manager 1245 may coordinate scheduling for transmissions to STAs 115 for various interference mitigation techniques such as beamforming or joint transmission. In some examples, the inter-station communications manager 1245 may provide an X2 interface within an LTE/LTE-A wireless communication network technology to provide communication between APs 105.

In some examples, the communications manager 1210 may be implemented as a wireless modem chipset, and the transceiver 1220 may be implemented as a set of analog components (e.g., amplifiers, filters, phase shifters, etc.) that are controlled by the communications manager 1210 to transmit and receive signals. The communications manager 1210 may couple with the transceiver 1220 over a receive interface and a transmit interface.

Figure 13:
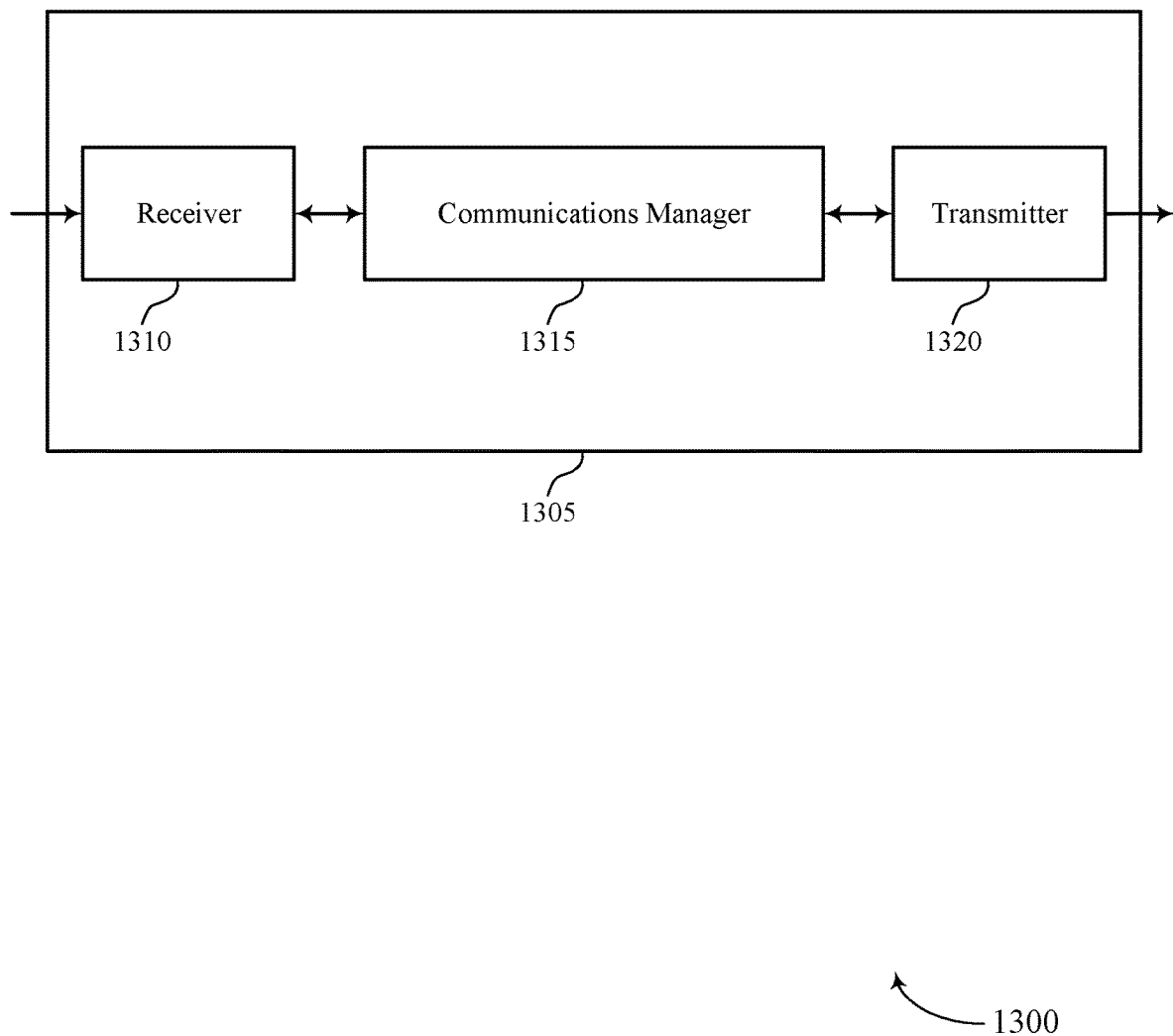
FIGS. 13 and 14 show block diagrams of devices that support soliciting in-BSS interference reports in accordance with aspects of the present disclosure.

FIG. 13 shows a block diagram 1300 of a device 1305 that supports soliciting in-BSS interference reports in accordance with aspects of the present disclosure. The device 1305 may be an example of aspects of a STA as described herein. The device 1305 may include a receiver 1310, a communications manager 1315, and a transmitter 1320. The device 1305 may also include a processor. Each of these components may be in communication with one another (e.g., via one or more buses).

Receiver 1310 may receive information such as packets, user data, or control information associated with various information channels (e.g., control channels, data channels, and information related to soliciting in-BSS interference reports, etc.). Information may be passed on to other components of the device. The receiver 1310 may be an example of aspects of the transceiver 1620 described with reference to FIG. 16. The receiver 1310 may utilize a single antenna or a set of antennas.

The communications manager 1315 may receive a first message to a first set of one or more STAs including the first station, the first message including an instruction to monitor a first wireless channel for interference by a second set of one or more STAs during an uplink transmission from the second set of one or more STAs over the first wireless channel, monitor the first wireless channel for interference from the second set of one or more STAs during the uplink transmission based on the first message, receive a second message to the first set of one or more STAs, the second message soliciting an interference report, and transmit an interference report based on the first message and the second message. The communications manager 1315 may also receive a set of directional training signals, each of the set of directional training signals corresponding to a sector of a plurality of sectors, determine a signal to noise ratio SNR parameter for each directional training signal of the set of directional training signals, and transmit an SNR report based on the received set of directional training signals and the determined SNR parameters. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

In some examples, the communications manager 1315 may be implemented as a wireless modem chipset, and the transmitter 1320 and the receiver 1310 may be implemented as a set of analog components (e.g., amplifiers, filters, phase shifters, etc.) that are controlled by the communications manager 1315 to transmit and receive signals, respectively. The communications manager 1315 may couple with the receiver 1310 over a receive interface and with the transmitter 1320 over a transmit interface.

The communications manager 1315 as described herein may be implemented to realize one or more potential advantages. One implementation may allow the device 1305 to more efficiently communicate with an AP 105. For example, the device 1305 may reliably communicate with a AP 105 based on the coordination of BSS by the AP 105. Thus, when the STA 115 communicates with the AP 105, interference may be reduced, which may reduce the chances of retransmissions. This may result in increased battery life and performance at the STA 1305. 05 may adjust an MCS or a grouping of STAs based on received interference information.

Figure 16:
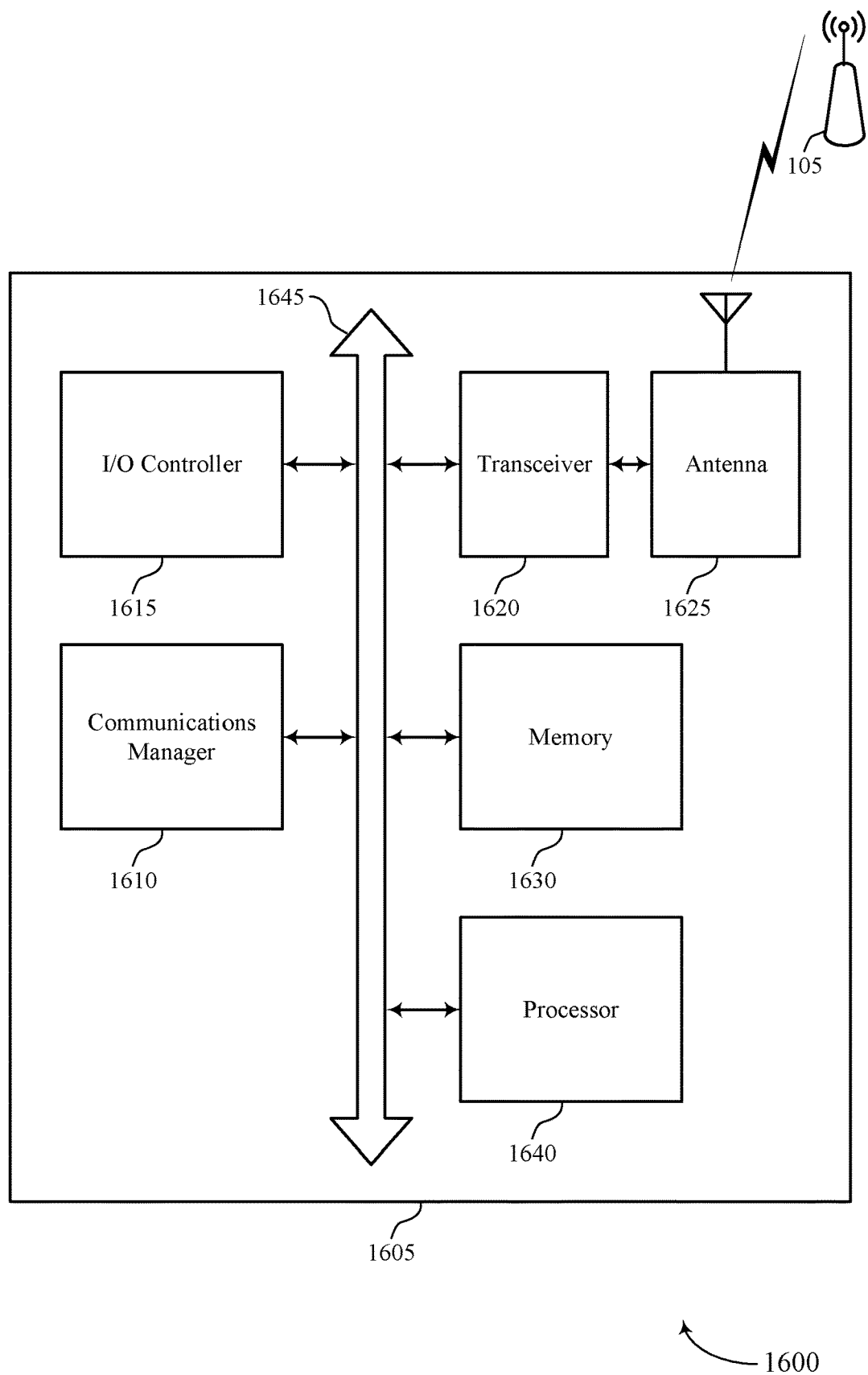
FIG. 16 shows a diagram of a system including a device that supports soliciting in-BSS interference reports in accordance with aspects of the present disclosure.

Based on implementing the in-BSS transmission mechanism techniques as described herein, a processor of a STA 115 (e.g., controlling the receiver 1310, the transmitter 1320, or the transceiver 1620 as described with reference to FIGS. 13 and 16 respectively) may be used more efficiently based on coordination of BSS. For example, because BSS may be coordinated based on the implementations descried herein, processing resources of an STA 105 may not be wasted on retransmissions due to signal interference between STAs 115 within a BSS.

Figure 14:
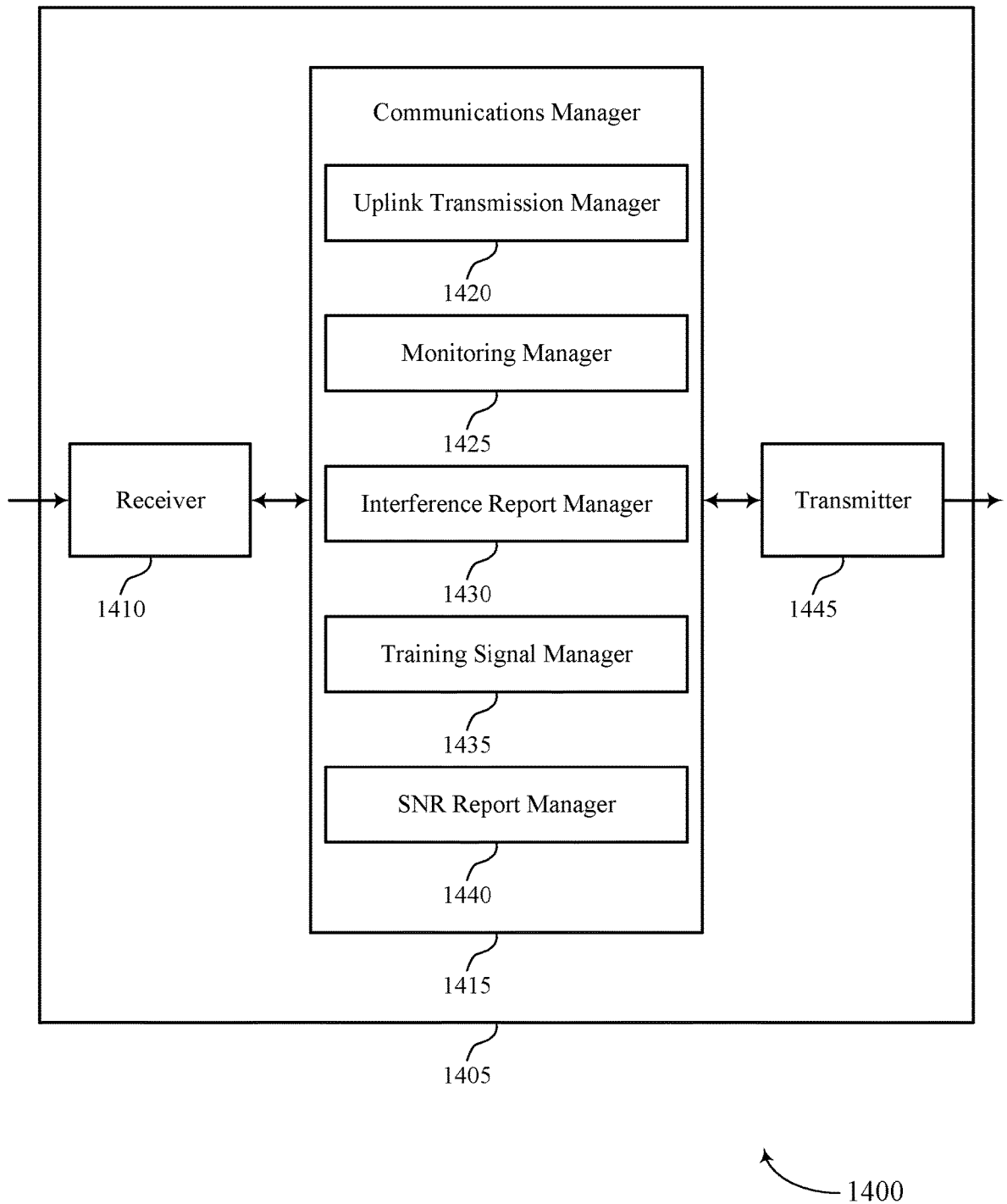

FIG. 14 shows a block diagram 1400 of a device 1405 that supports soliciting in-BSS interference reports in accordance with aspects of the present disclosure. The device 1405 may be an example of aspects of a device 1305 or a STA 115 as described herein. The device 1405 may include a receiver 1410, a communications manager 1415, and a transmitter 1445. The device 1405 may also include a processor. Each of these components may be in communication with one another (e.g., via one or more buses).

Receiver 1410 may receive information such as packets, user data, or control information associated with various information channels (e.g., control channels, data channels, and information related to soliciting in-BSS interference reports, etc.). Information may be passed on to other components of the device. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include an uplink transmission manager 1420, a monitoring manager 1425, an interference report manager 1430, a training signal manager 1435, and a SNR report manager 1440. The communications manager 1415 may be an example of aspects of the communications manager 1610 described herein.

The uplink transmission manager 1420 may receive a first message to a first set of one or more STAs including the first station, the first message including an instruction to monitor a first wireless channel for interference by a second set of one or more STAs during an uplink transmission from the second set of one or more STAs over the first wireless channel.

The monitoring manager 1425 may monitor the first wireless channel for interference from the second set of one or more STAs during the uplink transmission based on the first message.

The interference report manager 1430 may receive a second message to the first set of one or more STAs, the second message soliciting an interference report and transmit an interference report based on the first message and the second message.

The training signal manager 1435 may receive a set of directional training signals, each of the set of directional training signals corresponding to a sector of a plurality of sectors.

The SNR report manager 1440 may determine a signal to noise ratio SNR parameter for each directional training signal of the set of directional training signals and transmit an SNR report based on the received set of directional training signals and the determined SNR parameters.

Transmitter 1445 may transmit signals generated by other components of the device. In some examples, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

In some examples, the communications manager 1415 may be implemented as a wireless modem chipset, and the transmitter 1445 and the receiver 1410 may be implemented as a set of analog components (e.g., amplifiers, filters, phase shifters, etc.) that are controlled by the communications manager 1415 to transmit and receive signals, respectively. The communications manager 1415 may couple with the receiver 1410 over a receive interface and with the transmitter 1445 over a transmit interface.

Figure 15:
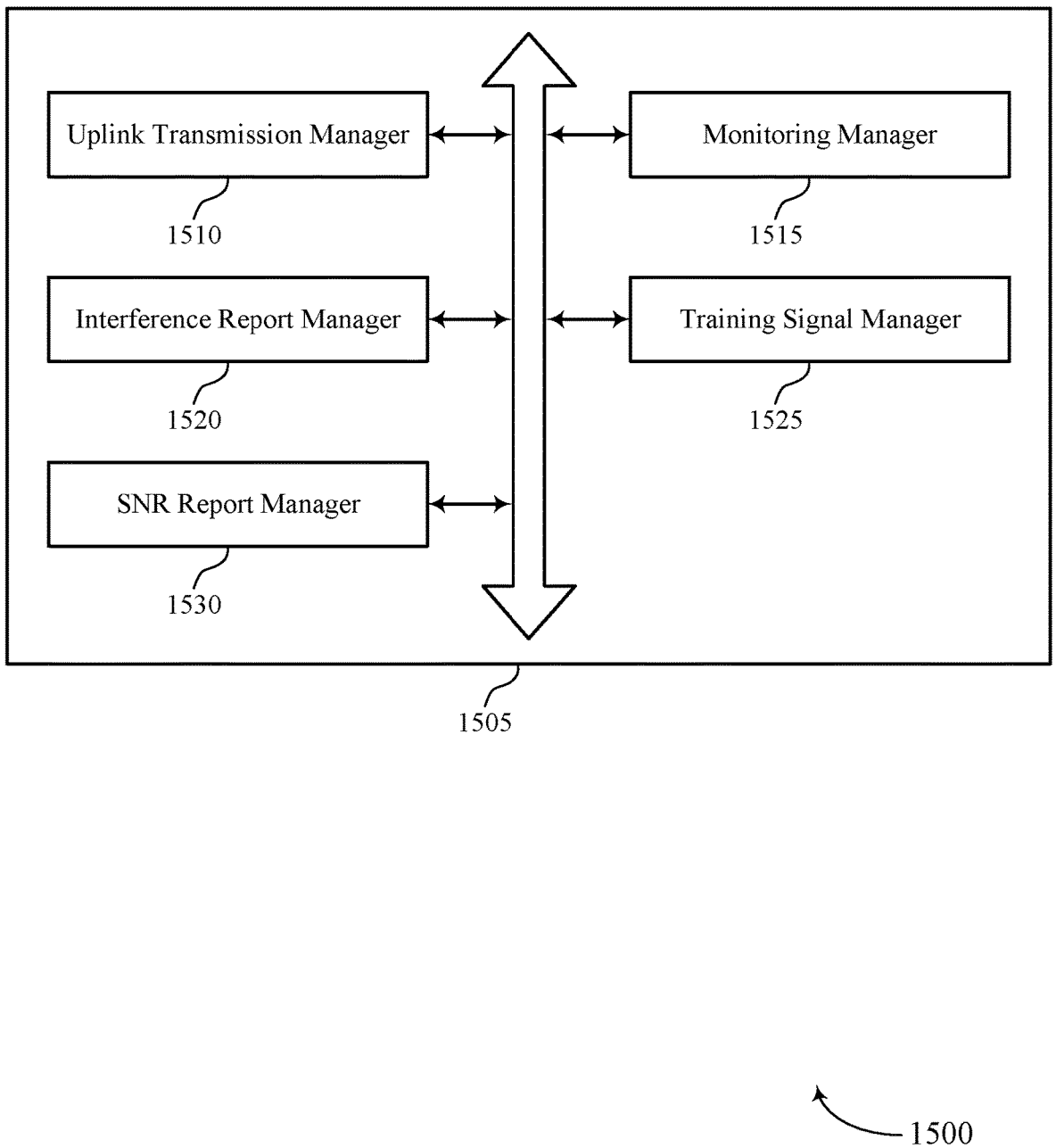
FIG. 15 shows a block diagram of a communications manager that supports soliciting in-BSS interference reports in accordance with aspects of the present disclosure.

FIG. 15 shows a block diagram 1500 of a communications manager 1505 that supports soliciting in-BSS interference reports in accordance with aspects of the present disclosure. The communications manager 1505 may be an example of aspects of a communications manager 1315, a communications manager 1415, or a communications manager 1610 described herein. The communications manager 1505 may include an uplink transmission manager 1510, a monitoring manager 1515, an interference report manager 1520, a training signal manager 1525, and a SNR report manager 1530. Each of these modules may communicate, directly or indirectly, with one another (e.g., via one or more buses).

The uplink transmission manager 1510 may receive a first message to a first set of one or more STAs including the first station, the first message including an instruction to monitor a first wireless channel for interference by a second set of one or more STAs during an uplink transmission from the second set of one or more STAs over the first wireless channel.

In some examples, the uplink transmission manager 1510 may receive a first frame including the first message to the first set of one or more STAs and a third message to the second set of one or more STAs. In some examples, the uplink transmission manager 1510 may determine that the first set of one or more STAs includes the first station, where receiving the first message for the first set of one or more STAs is based on the determining. In some examples, the uplink transmission manager 1510 may determine, based on the first frame, that the first set of one or more STAs includes the first station. In some cases, the first frame includes a trigger frame. In some cases, the first message includes a list of STA identifiers corresponding to the first set of one or more STAs or a group identifier identifying the first set of one or more STAs.

The monitoring manager 1515 may monitor the first wireless channel for interference from the second set of one or more STAs during the uplink transmission based on the first message. In some examples, the monitoring manager 1515 may receive the first message on a second wireless channel, where monitoring the first wireless channel is based on receiving the first message on the second wireless channel. In some cases, instructions to monitor the wireless channel further include instructions to monitor one or more of: a transmission band, a set of one or more subchannels, or a group of RUs. In some examples, the first message and the second message are from a first access point, and the first station comprises one or more of: a station associated with the first access point, a station not associated with the first access point, or a second access point.

The interference report manager 1520 may receive a second message to the first set of one or more STAs, the second message soliciting an interference report. In some examples, the interference report manager 1520 may transmit an interference report based on the first message and the second message. In some examples, the interference report manager 1520 may transmit a set of feedback report polls subsequent to the first feedback report poll. In some examples, the interference report manager 1520 may receive a set of feedback reports based on the set of feedback report polls, the set of feedback reports providing real time interference information during the uplink transmission. In some cases, the second message includes a BQRP or a CQI trigger. In some cases, the first message and the second message are included in a first feedback report poll. In some cases, the first feedback report poll is a trigger frame. In some cases, the feedback report poll includes one of a BQRP or a CQI trigger.

The training signal manager 1525 may receive a set of directional training signals, each of the set of directional training signals corresponding to a sector of a plurality of sectors.

The SNR report manager 1530 may determine a signal to noise ratio SNR parameter for each directional training signal of the set of directional training signals. In some examples, the SNR report manager 1530 may transmit an SNR report based on the received set of directional training signals and the determined SNR parameters. FIG. 16 shows a diagram of a system 1600 including a device 1605 that supports soliciting in-BSS interference reports in accordance with aspects of the present disclosure. The device 1605 may be an example of or include the components of device 1305, device 1405, or a STA as described herein. The device 1605 may include components for bi-directional voice and data communications including components for transmitting and receiving communications, including a communications manager 1610, an I/O controller 1615, a transceiver 1620, an antenna 1625, memory 1630, and a processor 1640. These components may be in electronic communication via one or more buses (e.g., bus 1645).

The communications manager 1610 may receive a first message to a first set of one or more STAs including the first station, the first message including an instruction to monitor a first wireless channel for interference by a second set of one or more STAs during an uplink transmission from the second set of one or more STAs over the first wireless channel, monitor the first wireless channel for interference from the second set of one or more STAs during the uplink transmission based on the first message, receive a second message to the first set of one or more STAs, the second message soliciting an interference report, and transmit an interference report based on the first message and the second message. The communications manager 1610 may also receive a set of directional training signals, each of the set of directional training signals corresponding to a sector of a plurality of sectors, determine a signal to noise ratio SNR parameter for each directional training signal of the set of directional training signals, and transmit an SNR report based on the received set of directional training signals and the determined SNR parameters. In some examples, the set of directional training signals is from a first access point, and the station comprises one or more of: a station associated with the first access point, a station not associated with the first access point, or a second access point.

I/O controller 1615 may manage input and output signals for device 1605. I/O controller 1615 may also manage peripherals not integrated into device 1605. In some cases, I/O controller 1615 may represent a physical connection or port to an external peripheral. In some cases, I/O controller 1615 may utilize an operating system such as iOS®, ANDROID®, MS-DOS®, MS-WINDOWS®, OS/2®, UNIX®, LINUX®, or another known operating system. In other cases, I/O controller 1615 may represent or interact with a modem, a keyboard, a mouse, a touchscreen, or a similar device. In some cases, I/O controller 1615 may be implemented as part of a processor. In some cases, a user may interact with device 1605 via I/O controller 1615 or via hardware components controlled by I/O controller 1615.

Transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

Memory 1630 may include RAM and ROM. The memory 1630 may store computer-readable, computer-executable software 1635 including instructions that, when executed, cause the processor to perform various functions described herein. In some cases, the memory 1630 may contain, among other things, a BIOS which may control basic hardware or software operation such as the interaction with peripheral components or devices.

Processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1640 may be configured to operate a memory array using a memory controller. In other cases, a memory controller may be integrated into processor 1640. Processor 1640 may be configured to execute computer-readable instructions stored in a memory to perform various functions (e.g., functions or tasks supporting soliciting in-BSS interference reports).

In some examples, the communications manager 1610 may be implemented as a wireless modem chipset, and the transceiver 1620 may be implemented as a set of analog components (e.g., amplifiers, filters, phase shifters, etc.) that are controlled by the communications manager 1610 to transmit and receive signals. The communications manager 1610 may couple with the transceiver 1620 over a receive interface and a transmit interface.

Figure 17:
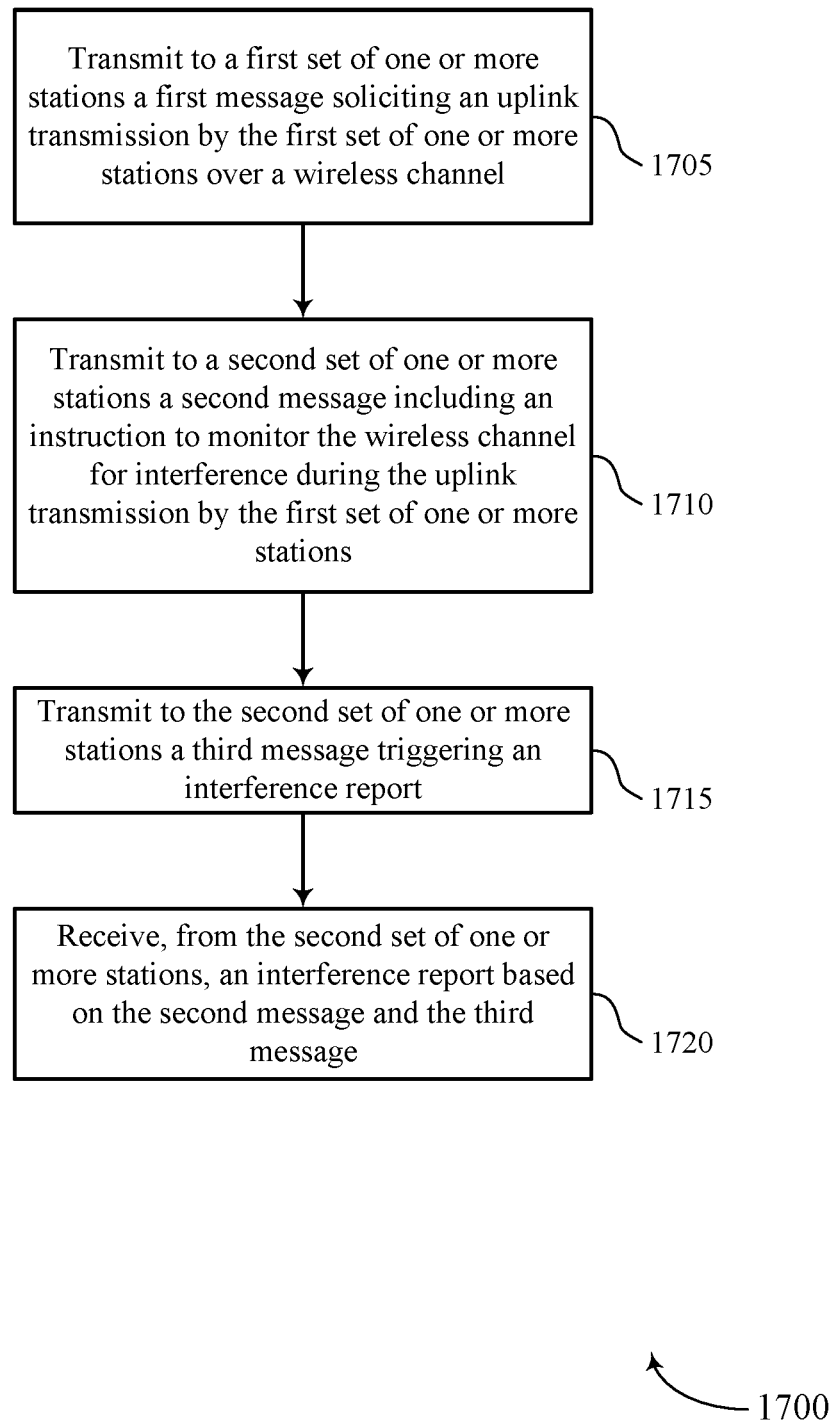
FIGS. 17 through 20 show flowcharts illustrating methods that support soliciting in-BSS interference reports in accordance with aspects of the present disclosure.

FIG. 17 shows a flowchart illustrating a method 1700 that supports soliciting in-BSS interference reports in accordance with aspects of the present disclosure. The operations of method 1700 may be implemented by an AP or its components as described herein. For example, the operations of method 1700 may be performed by a communications manager as described with reference to FIGS. 9 through 12. In some examples, an AP may execute a set of instructions to control the functional elements of the AP to perform the functions described below. Additionally or alternatively, an AP may perform aspects of the functions described below using special-purpose hardware.

At 1705, the AP may transmit to a first set of one or more STAs a first message soliciting an uplink transmission by the first set of one or more STAs over a wireless channel. The operations of 1705 may be performed according to the methods described herein. In some examples, aspects of the operations of 1705 may be performed by an uplink transmission manager as described with reference to FIGS. 9 through 12.

At 1710, the AP may transmit to a second set of one or more STAs a second message including an instruction to monitor the wireless channel for interference during the uplink transmission by the first set of one or more STAs. The operations of 1710 may be performed according to the methods described herein. In some examples, aspects of the operations of 1710 may be performed by a monitoring manager as described with reference to FIGS. 9 through 12.

At 1715, the AP may transmit to the second set of one or more STAs a third message triggering an interference report. The operations of 1715 may be performed according to the methods described herein. In some examples, aspects of the operations of 1715 may be performed by an interference report manager as described with reference to FIGS. 9 through 12.

At 1720, the AP may receive, from the second set of one or more STAs, an interference report based on the second message and the third message. The operations of 1720 may be performed according to the methods described herein. In some examples, aspects of the operations of 1720 may be performed by an interference report manager as described with reference to FIGS. 9 through 12.

Figure 18:
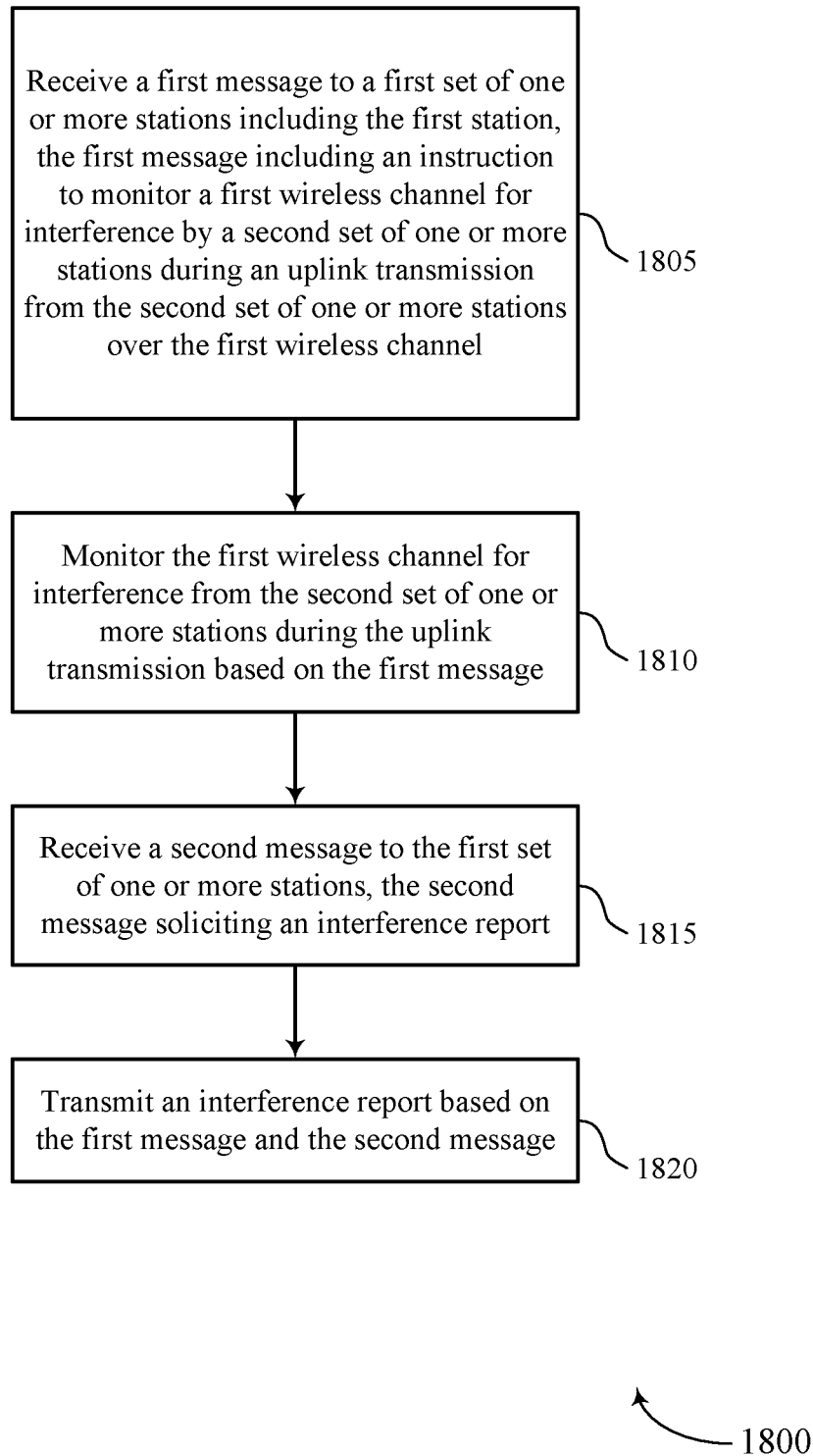

FIG. 18 shows a flowchart illustrating a method 1800 that supports soliciting in-BSS interference reports in accordance with aspects of the present disclosure. The operations of method 1800 may be implemented by a STA or its components as described herein. For example, the operations of method 1800 may be performed by a communications manager as described with reference to FIGS. 13 through 16. In some examples, a STA may execute a set of instructions to control the functional elements of the STA to perform the functions described below. Additionally or alternatively, a STA may perform aspects of the functions described below using special-purpose hardware.

At 1805, the STA may receive a first message to a first set of one or more STAs including the first station, the first message including an instruction to monitor a first wireless channel for interference by a second set of one or more STAs during an uplink transmission from the second set of one or more STAs over the first wireless channel. The operations of 1805 may be performed according to the methods described herein. In some examples, aspects of the operations of 1805 may be performed by an uplink transmission manager as described with reference to FIGS. 13 through 16.

At 1810, the STA may monitor the first wireless channel for interference from the second set of one or more STAs during the uplink transmission based on the first message. The operations of 1810 may be performed according to the methods described herein. In some examples, aspects of the operations of 1810 may be performed by a monitoring manager as described with reference to FIGS. 13 through 16.

At 1815, the STA may receive a second message to the first set of one or more STAs, the second message soliciting an interference report. The operations of 1815 may be performed according to the methods described herein. In some examples, aspects of the operations of 1815 may be performed by an interference report manager as described with reference to FIGS. 13 through 16.

At 1820, the STA may transmit an interference report based on the first message and the second message. The operations of 1820 may be performed according to the methods described herein. In some examples, aspects of the operations of 1820 may be performed by an interference report manager as described with reference to FIGS. 13 through 16.

Figure 19:
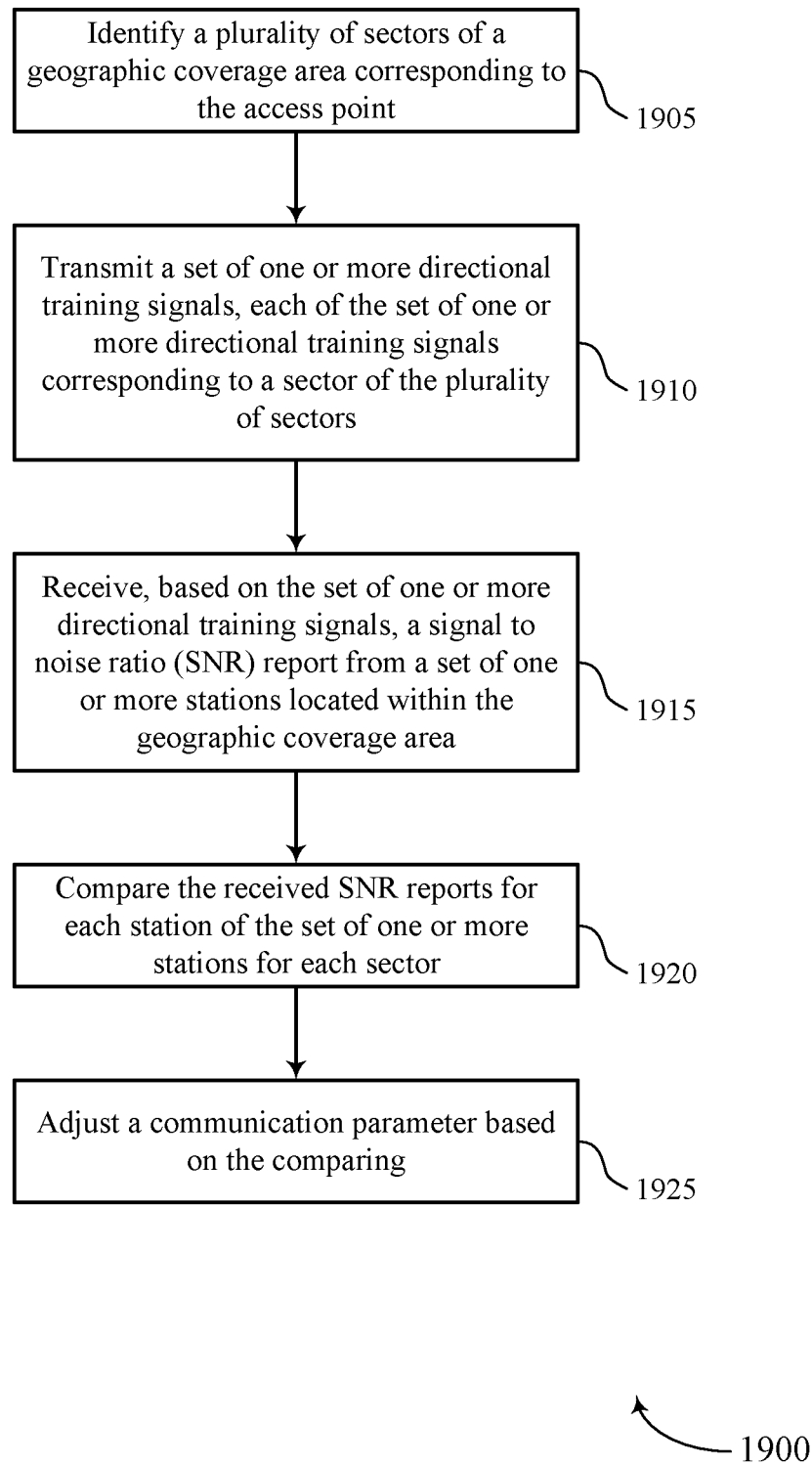

FIG. 19 shows a flowchart illustrating a method 1900 that supports soliciting in-BSS interference reports in accordance with aspects of the present disclosure. The operations of method 1900 may be implemented by an AP or its components as described herein. For example, the operations of method 1900 may be performed by a communications manager as described with reference to FIGS. 9 through 12. In some examples, an AP may execute a set of instructions to control the functional elements of the AP to perform the functions described below. Additionally or alternatively, an AP may perform aspects of the functions described below using special-purpose hardware.

At 1905, the AP may identify a plurality of sectors of a geographic coverage area corresponding to the AP. The operations of 1905 may be performed according to the methods described herein. In some examples, aspects of the operations of 1905 may be performed by a sector manager as described with reference to FIGS. 9 through 12.

At 1910, the AP may transmit a set of one or more directional training signals, each of the set of one or more directional training signals corresponding to a sector of the plurality of sectors. The operations of 1910 may be performed according to the methods described herein. In some examples, aspects of the operations of 1910 may be performed by a training signal manager as described with reference to FIGS. 9 through 12.

At 1915, the AP may receive, based on the set of one or more directional training signals, a signal to noise ratio SNR report from each STA located within the geographic coverage area. The operations of 1915 may be performed according to the methods described herein. In some examples, aspects of the operations of 1915 may be performed by a SNR report manager as described with reference to FIGS. 9 through 12.

At 1920, the AP may compare the received SNR reports for each STA on a per sector basis. The operations of 1920 may be performed according to the methods described herein. In some examples, aspects of the operations of 1920 may be performed by a SNR report manager as described with reference to FIGS. 9 through 12.

At 1925, the AP may adjust a communication parameter based on the comparing. The operations of 1925 may be performed according to the methods described herein. In some examples, aspects of the operations of 1925 may be performed by a communication parameter manager as described with reference to FIGS. 9 through 12.

Figure 20:
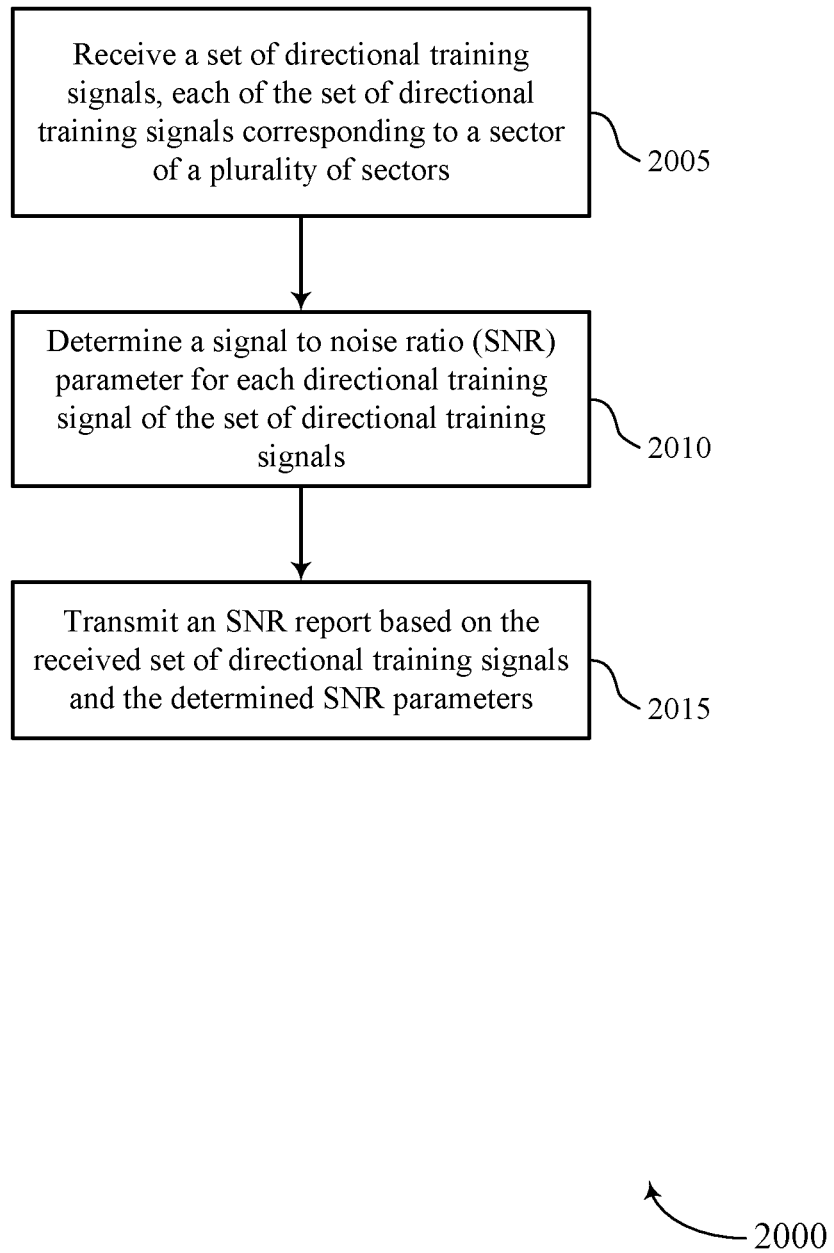

FIG. 20 shows a flowchart illustrating a method 2000 that supports soliciting in-BSS interference reports in accordance with aspects of the present disclosure. The operations of method 2000 may be implemented by a STA or its components as described herein. For example, the operations of method 2000 may be performed by a communications manager as described with reference to FIGS. 13 through 16. In some examples, a STA may execute a set of instructions to control the functional elements of the STA to perform the functions described below. Additionally or alternatively, a STA may perform aspects of the functions described below using special-purpose hardware.

At 2005, the STA may receive a set of directional training signals, each of the set of directional training signals corresponding to a sector of a plurality of sectors. The operations of 2005 may be performed according to the methods described herein. In some examples, aspects of the operations of 2005 may be performed by a training signal manager as described with reference to FIGS. 13 through 16.

At 2010, the STA may determine a signal to noise ratio SNR parameter for each directional training signal of the set of directional training signals. The operations of 2010 may be performed according to the methods described herein. In some examples, aspects of the operations of 2010 may be performed by a SNR report manager as described with reference to FIGS. 13 through 16.

At 2015, the STA may transmit an SNR report based on the received set of directional training signals and the determined SNR parameters. The operations of 2015 may be performed according to the methods described herein. In some examples, aspects of the operations of 2015 may be performed by a SNR report manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the APs 105 may have similar frame timing, and transmissions from different APs 105 may be approximately aligned in time. For asynchronous operation, the APs 105 may have different frame timing, and transmissions from different APs 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at an access point, comprising:
a first interface;
a second interface; and
a wireless modem coupled with the first interface and the second interface, wherein the wireless modem is configured to:
transmit to a first set of one or more stations a first message soliciting an uplink transmission by the first set of one or more stations over a wireless channel;
transmit to a second set of one or more stations different from the first set of one or more stations, a second message comprising an instruction to monitor the wireless channel for interference during the uplink transmission by the first set of one or more stations;
transmit to the second set of one or more stations a third message triggering an interference report; and
receive, from the second set of one or more stations, the interference report based at least in part on the second message and the third message.

2. The apparatus of claim 1, wherein the wireless modem is further configured to:
adjust a communication parameter based at least in part on one or more of: the interference report or an identification of a hidden node.

3. The apparatus of claim 2, wherein the communication parameter comprises one or more of a modulation and coding scheme (MCS), a resource unit (RU) size, or an RU allocation.

4. The apparatus of claim 2, wherein the wireless modem is further configured to:
modify, based at least in part on the interference report, one or more of: the first set of one or more stations or the second set of one or more stations or generate, based at least in part on the interference report, a third set of one or more stations.

5. The apparatus of claim 1, wherein the wireless modem is further configured to:
transmit a first portion of a first frame comprising the first message; and
transmit a second portion of the first frame comprising the second message.

6. The apparatus of claim 5, wherein the first frame is a first trigger frame.

7. The apparatus of claim 1, wherein the wireless modem is further configured to:
transmit the first message on a first channel and transmitting the second message on a second channel.

8. The apparatus of claim 1, wherein each of the first set of one or more stations and the second set of one or more stations comprises one or more of: a station associated with the access point, a station not associated with the access point, or a second access point.

9. The apparatus of claim 8, wherein the wireless modem is further configured to:
selectively allocate resources of a transmission opportunity to the second access point for a multi-access point coordinated transmission based at least in part on the interference report.

10. An apparatus for wireless communication at a first station, comprising:
a first interface;
a second interface; and
a wireless modem coupled with the first interface and the second interface, wherein the wireless modem is configured to:
receive a first message to a first set of one or more stations including the first station, the first message comprising an instruction to monitor a first wireless channel for interference by a second set of one or more stations different from the first set of one or more stations and during an uplink transmission from the second set of one or more stations over the first wireless channel;
monitor the first wireless channel for interference from the second set of one or more stations during the uplink transmission based at least in part on the first message;
receive a second message from the first set of one or more stations, the second message soliciting an interference report; and
transmit the interference report based at least in part on the first message and the second message.

11. The apparatus of claim 10, wherein the wireless modem is further configured to:
receive a first frame including the first message to the first set of one or more stations and a third message to the second set of one or more stations; and
determine that the first set of one or more stations includes the first station, wherein receiving the first message for the first set of one or more stations is based at least in part on the determining.

12. The apparatus of claim 11, wherein the first frame comprises a trigger frame.

13. The apparatus of claim 11, wherein the wireless modem is further configured to:
determine, based at least in part on the first frame, that the first set of one or more stations includes the first station.

14. The apparatus of claim 11, wherein the first message comprises a first user information field, and the wireless modem is further configured to:
a list of station identifiers corresponding to the first set of one or more stations or a group identifier identifying the first set of one or more stations.

15. The apparatus of claim 11, wherein the second message comprises a bandwidth query report poll (BQRP) or a channel quality information (CQI) trigger.

16. The apparatus of claim 10, wherein the wireless modem is further configured to:
receive the first message on a second wireless channel, wherein monitoring the first wireless channel is based at least in part on receiving the first message on the second wireless channel.

17. The apparatus of claim 16, wherein the first message and the second message are included in a first feedback report poll.

18. The apparatus of claim 17, wherein the first feedback report poll is a trigger frame.

19. The apparatus of claim 17, wherein the wireless modem is further configured to:
transmit a plurality of feedback report polls subsequent to the first feedback report poll; and
receive a plurality of feedback reports based at least in part on the plurality of feedback report polls, the plurality of feedback reports providing real time interference information during the uplink transmission.

20. The apparatus of claim 17, wherein the first feedback report poll comprises one of a bandwidth query report poll (BQRP) or a channel quality information (CQI) trigger.

21. The apparatus of claim 10, wherein the wireless modem is configured to monitor one or more of: a transmission band, a set of one or more subchannels, or a group of resource units (RUs).

22. The apparatus of claim 10, wherein the first message and the second message are from a first access point, and the first station comprises one or more of: a station associated with the first access point, a station not associated with the first access point, or a second access point.

23. An apparatus for wireless communication at an access point, comprising:
- a first interface;
- a second interface; and
- a wireless modem coupled with the first interface and the second interface, wherein the wireless modem is configured to:
  - identify a plurality of sectors of a geographic coverage area corresponding to the access point;
  - transmit a set of one or more directional training signals, each of the set of one or more directional training signals corresponding to a sector of the plurality of sectors;
  - receive, based at least in part on the set of one or more directional training signals, a signal to noise ratio (SNR) report from a set of one or more stations located within the geographic coverage area;
  - compare the received SNR reports for each station for each of the set of one or more stations; and
  - adjust a communication parameter based at least in part on the comparing.

24. The apparatus of claim 23, wherein the wireless modem is further configured to:
generate an SNR matrix for each station located within the geographic coverage area with respect to each sector of the plurality of sectors, wherein adjusting the communication parameter is based at least in part on the SNR matrix.

25. The apparatus of claim 23, wherein the wireless modem is further configured to:
identify a computational complexity threshold for the access point; and
determine an angular width for each sector of the plurality of sectors based at least in part on the identified computational complexity threshold.

26. The apparatus of claim 23, wherein the wireless modem is further configured to:
identify a hidden node, wherein adjusting the communication parameter is based at least in part on the identifying.

27. The apparatus of claim 23, wherein the wireless modem is further configured to:
modify, based at least in part on the comparing, one or more sets of one or more stations; and
generate, based at least in part on the received SNR reports, one or more sets of stations.

28. The apparatus of claim 23, wherein the access point is a first access point and the set of one or more stations for each sector of the plurality of sectors comprises one or more of: a station associated with the access point, a station not associated with the access point, or a second access point.

29. An apparatus for wireless communication at a station, comprising: a first interface; a second interface; and a wireless modem coupled with the first interface and the second interface, wherein the wireless modem is configured to:
- receive a set of directional training signals, each of the set of directional training signals corresponding to a sector of a plurality of sectors;
- determine a signal to noise ratio (SNR) parameter for each directional training signal of the set of directional training signals; and
- transmit an SNR report based at least in part on the received set of directional training signals and the determined SNR parameters.

30. The apparatus of claim 29, wherein the set of directional training signals is from a first access point, and the station comprises one or more of: a station associated with the first access point, a station not associated with the first access point, or a second access point.

* * * * *